United States Patent
Cheeseman et al.

(10) Patent No.: US 11,840,455 B2
(45) Date of Patent: Dec. 12, 2023

(54) MINERAL COMPOSITIONS

(71) Applicant: ImerTech SAS, Paris (FR)

(72) Inventors: Matthew Cheeseman, Camborne (GB);
Janet Preston, St Austell (GB);
Graham M. Pring, Lostwithiel (GB)

(73) Assignee: ImerTech SAS, Paris (FR)

( * ) Notice: Subject to any disclaimer, the term of this patent is extended or adjusted under 35 U.S.C. 154(b) by 455 days.

(21) Appl. No.: 15/737,113

(22) PCT Filed: Jun. 30, 2016

(86) PCT No.: PCT/GB2016/051982
§ 371 (c)(1),
(2) Date: Dec. 15, 2017

(87) PCT Pub. No.: WO2017/001857
PCT Pub. Date: Jan. 5, 2017

(65) Prior Publication Data
US 2018/0186652 A1    Jul. 5, 2018

(30) Foreign Application Priority Data
Jun. 30, 2015    (GB) ...................... 1511492

(51) Int. Cl.
*C01F 11/18*    (2006.01)
*D21H 19/38*    (2006.01)
(Continued)

(52) U.S. Cl.
CPC ............... *C01F 11/18* (2013.01); *C09D 1/00* (2013.01); *D21H 17/675* (2013.01);
(Continued)

(58) Field of Classification Search
CPC .. C09C 1/021; C01P 2004/51; C01P 2004/53; C01F 11/18; C01F 11/181;
(Continued)

(56) References Cited

U.S. PATENT DOCUMENTS 5,576,617 A * 11/1996 Webb ................. G01N 15/0266
137/5
5,663,224 A * 9/1997 Emmons ................. C08J 3/215
523/210
(Continued)

FOREIGN PATENT DOCUMENTS

AP           986 A * 8/2001 ............ C01F 11/181
EP    0614948 A1 * 9/1994 ............. C09C 1/021
(Continued)

OTHER PUBLICATIONS

Preston et al., Formulation Optimisation for LWC Printability, PaperCon 2011, pp. 439-464 downloaded on Nov. 4, 2019 from https://www.tappi.org/content/events/11papercon/documents/190.515%20ppt.pdf (Year: 2011).*
(Continued)

*Primary Examiner* — Monique R Jackson
(74) *Attorney, Agent, or Firm* — Finnegan, Henderson, Farabow, Garrett & Dunner, LLP

(57) ABSTRACT

A composition comprising at least one inorganic particulate material such as calcium carbonate, use of a said composition in a barrier coating composition or in a paper coating composition, a method for making said composition, a method for making a paper coating composition and a method for making a coated product.

12 Claims, 2 Drawing Sheets

(51) Int. Cl.
 D21H 21/52 (2006.01)
 D21H 17/67 (2006.01)
 C09D 1/00 (2006.01)
(52) U.S. Cl.
 CPC .......... D21H 19/385 (2013.01); D21H 21/52 (2013.01); *C01P 2004/51* (2013.01); *C01P 2004/61* (2013.01); *C01P 2004/62* (2013.01); *C01P 2006/14* (2013.01); *C01P 2006/16* (2013.01); *Y02P 20/582* (2015.11)
(58) Field of Classification Search
 CPC .............. C01F 11/182; C01F 11/184; C08K 2003/265; C08K 2201/014; C08K 3/26; C08K 2201/003; D21H 19/385; C09D 1/00
 See application file for complete search history.

(56) References Cited

U.S. PATENT DOCUMENTS

| | | | | |
|---|---|---|---|---|
| 5,861,209 | A * | 1/1999 | Haskins | D21H 21/52 428/340 |
| 2002/0035949 | A1 | 3/2002 | Hirons et al. | |
| 2003/0094120 | A1* | 5/2003 | Golley | C09C 1/42 106/486 |
| 2009/0236062 | A1* | 9/2009 | Fugitt | D21H 11/04 162/137 |
| 2010/0075148 | A1* | 3/2010 | Rainer | C01F 11/185 428/402 |
| 2011/0196083 | A1 | 8/2011 | Rainer et al. | |
| 2013/0251921 | A1* | 9/2013 | Gane | B02C 23/12 428/32.37 |
| 2015/0263325 | A1 | 9/2015 | Honda et al. | |
| 2017/0369329 | A1* | 12/2017 | Paynter | C01F 5/24 |
| 2020/0354894 | A1* | 11/2020 | Giuste | D21G 1/0246 |

FOREIGN PATENT DOCUMENTS

| | | |
|---|---|---|
| EP | 1 456 470 | 9/2004 |
| EP | 1 764 347 A1 | 3/2007 |
| WO | WO 2004/059079 A2 | 7/2004 |
| WO | WO-2004114014 A1 * | 12/2004 ............. B41M 5/42 |
| WO | WO 2006/060368 A2 | 6/2006 |
| WO | WO 2012/177679 A1 | 12/2012 |
| WO | WO 2013/121213 A1 | 8/2013 |
| WO | WO 2014/083988 | 1/2017 |

OTHER PUBLICATIONS

Kumar, Influence of particle size distribution of calcium carbonate pigments on coated paper whiteness, 2011, J. Coat. Technol. Res., vol. 8 (5), pp. 613-618. (Year: 2011).*

International Search Report and Written Opinion dated Sep. 19, 2016, in International Application No. PCT/GB2016/051982 (11 pgs.).

Gibson et al., "Determination of the critical pigment volume concentrations of pigmented film coating formulations using gloss measurement", International Journal of Pharmaceutics, 45, Jan. 28, 1988, pp. 245-248.

Gantenbein et al., "Determining the size distribution-defined aspect ratio of rod-like particles," Applied Clay Science (2011).

* cited by examiner

MINERAL COMPOSITIONS

CLAIM FOR PRIORITY

This application is a U.S. national phase entry under 35 U.S.C. § 371 from PCT International Application No. PCT/GB2016/051982, filed Jun. 30, 2016, which claims the benefit of priority of GB Application No. 1511492.9, filed Jun. 30, 2015, both of which this application claims priority and both of which are incorporated herein by reference.

FIELD OF THE INVENTION

The present invention relates generally to compositions comprising at least one inorganic particulate material such as calcium carbonate. The present invention further relates to the use of these compositions in barrier coating compositions and paper coating compositions. As such, the present invention also relates to a barrier coating composition and a paper coating composition comprising at least one inorganic particulate material, and a product coated with said compositions. In addition, the present invention relates to a method for making a composition comprising at least one inorganic particulate material, a method for making a paper coating composition, and a method for making a coated product.

BACKGROUND OF THE INVENTION

Compositions comprising one or more inorganic particulate materials are used widely in a number of applications. For example, inorganic particulate materials may be used as fillers in coating compositions, paints, plastics and sealants. For example, inorganic particulate materials may be used in coating compositions such as barrier coating compositions, which prevent or reduce the permeation of a selected substrate such as gas, vapour or liquid. Inorganic particulate materials may also, for example, be used in paper coating compositions.

The presence of the inorganic particulate material in the barrier coating composition or paper coating composition may affect the properties of the composition, such as colour, opacity, brightness, gloss, rheology or hardness. Alternatively or additionally, the use of inorganic particulate materials in these compositions may affect the barrier properties of the composition (the ability of the composition to prevent or reduce permeation of a selected substrate such as gas, vapour or liquid).

Barrier coating compositions and paper coating compositions usually require the presence of one or more binders such as latex in order to provide the composition with the desired barrier properties. It is generally desirable to reduce the amount of binder used in the barrier coating composition or paper coating composition for cost and/or environmental reasons. The addition of compositions comprising inorganic particulate material to barrier coating or paper coating compositions may enable the amount of binder required in the composition to be reduced.

It is thus desirable to provide an alternative and/or an improved composition comprising inorganic particulate material which is suitable for use in a barrier coating composition and/or a paper coating composition. For example, it may be desirable to provide a composition comprising inorganic particulate material which can be used to reduce the amount of binder required in a barrier coating and/or paper coating composition.

SUMMARY OF THE INVENTION

In accordance with a first aspect of the present invention, there is provided a composition comprising at least one inorganic particulate material (e.g. calcium carbonate), wherein the inorganic particulate material in said composition has a CPVC point of less than about 29 pph binder.

In accordance with a second aspect of the present invention, there is provided a method for making a composition comprising at least one inorganic particulate material (e.g. a composition of the first aspect of the present invention), comprising combining a first inorganic particulate material component (e.g. calcium carbonate) having a first particle size distribution with a second inorganic particulate material component (e.g. calcium carbonate) having a second particle size distribution. In certain embodiments of the second aspect of the present invention, the method further comprises combining a third inorganic particulate material component (e.g. calcium carbonate) having a third particle size distribution with the first and/or second inorganic particulate material components. In certain embodiments of the second aspect of the present invention, the method further comprises combining a third inorganic particulate material component (e.g. calcium carbonate) having a third particle size distribution and a fourth inorganic particulate material component (e.g. calcium carbonate) having a fourth particle size distribution with the first and/or second inorganic particulate material components. In certain embodiments, a fifth inorganic particulate material component (e.g. calcium carbonate) having a fifth particle size distribution may be combined with the first and/or second and/or optional third and/or optional fourth inorganic particulate material components.

In accordance with a third aspect of the present invention, there is provided a composition comprising at least one inorganic particulate material obtainable or obtained by the method of the second aspect of the present invention.

In accordance with a fourth aspect of the present invention, there is provided a use of a composition of any aspect or embodiment of the present invention in a barrier coating composition.

In accordance with a fifth aspect of the present invention, there is provided a barrier coating composition comprising a binder and a composition of any aspect or embodiment of the present invention.

In accordance with a sixth aspect of the present invention, there is provided a use of a composition of any aspect or embodiment of the present invention in a paper coating composition.

In accordance with a seventh aspect of the present invention, there is provided a paper coating composition comprising a binder and a composition of any aspect or embodiment of the present invention.

In accordance with an eighth aspect of the present invention, there is provided a product coated with a composition of any aspect or embodiment of the present invention.

In accordance with a ninth aspect of the present invention, there is provided a method for making a barrier coating composition or a paper coating composition comprising combining a composition of any aspect or embodiment of the present invention with a binder.

In accordance with a tenth aspect of the present invention, there is provided a method for making a coated product, comprising providing a product to be coated and coating the product with a composition of any aspect or embodiment of the present invention (e.g. a barrier coating composition or paper coating composition).

In certain embodiments of any aspect of the present invention, the inorganic particulate material in the composition has a CPVC point equal to or less than about 28 pph binder. In certain embodiments, the inorganic particulate material in the composition has a CPVC point equal to or less than about 25 pph binder. In certain embodiments, the inorganic particulate material in the composition has a CPVC point equal to or less than about 23 pph binder. In certain embodiments, the binder used to measure the CPVC point is latex. In certain embodiments, the binder used to measure the CPVC point is styrene butadiene rubber (SBR) latex.

In certain embodiments of any aspect of the present invention, the inorganic particulate material in the composition has a mean pore size equal to or less than about 1.1 µm. In certain embodiments, the inorganic particulate material in the composition has a mean pore size equal to or less than about 1.0 µm. In certain embodiments, the inorganic particulate material in the composition has a mean pore size ranging from about 0.01 µm to about 1.1 µm.

In certain embodiments of any aspect of the present invention, the inorganic particulate material in the composition has a coating pore volume equal to or less than about 0.4 $cm^3g^{-1}$. In certain embodiments, the inorganic particulate material in the composition has a coating pore volume equal to or less than about 0.15 $cm^3g^{-1}$. In certain embodiments, the inorganic particulate material in the composition has a coating pore volume equal to or less than about 0.14 $cm^3g^{-1}$.

In certain embodiments of any aspect of the present invention, the inorganic particulate material in the composition has a steepness factor equal to or less than about 60. In certain embodiments, the inorganic particulate material in the composition has a steepness factor equal to or less than about 30. In certain embodiments, the composition has a steepness factor equal to or less than about 25.

In certain embodiments of any aspect of the present invention, the at least one inorganic particulate material has a shape factor equal to or less than about 20. In certain embodiments, the at least one inorganic particulate material has a shape factor equal to or less than about 10. In certain embodiments of any aspect of the present invention, the at least one inorganic particulate material has a shape factor equal to or less than about 5.

In certain embodiments of any aspect of the present invention, the at least one inorganic particulate material is calcium carbonate.

In certain embodiments of any aspect of the present invention, the inorganic particulate material in the composition has a $d_{50}$ ranging from about 0.1 µm to about 3.0 µm. In certain embodiments, the composition has a $d_{50}$ ranging from about 0.2 µm to about 2.0 µm. In certain embodiments, the composition has a $d_{50}$ ranging from about 0.2 µm to about 1.5 µm. In certain embodiments, the inorganic particulate material in the composition has a $d_{50}$ ranging from about 0.2 µm to about 1.0 µm. In certain embodiments, the inorganic particulate material in the composition has a $d_{50}$ ranging from about 0.2 µm to about 0.8 µm.

In certain embodiments of any aspect of the present invention, the composition has a coating stain length ranging from about 9 cm to about 12 cm. In certain embodiments, the composition has a coating stain length ranging from about 9 cm to about 10 cm.

In certain embodiments of any aspect of the present invention, the composition comprises a first inorganic particulate material component having a first particle size distribution and a second inorganic particulate material component having a second particle size distribution.

In accordance with a further aspect of the present invention there is provided a composition comprising a first inorganic particulate material component having a first particle size distribution and a second inorganic particulate material component having a second particle size distribution.

In certain embodiments of any aspect of the present invention, the first inorganic particulate material component is calcium carbonate. In certain embodiments of any aspect of the present invention, the second inorganic particulate material component is calcium carbonate. In certain embodiments of any aspect of the present invention, both the first and second inorganic particulate material components are calcium carbonate.

In certain embodiments of any aspect of the present invention, the steepness factor of the total inorganic particulate material in the composition is equal to or lower than the steepness factor of the inorganic particulate material component having the lowest steepness factor.

In certain embodiments of any aspect of the present invention, wherein the composition comprises a first inorganic particulate material component having a first particle size distribution and a second inorganic particulate material component having a second particle size distribution, the first inorganic particulate material component has a steepness factor equal to or more than about 15. In certain embodiments, the first inorganic particulate material component has a steepness factor equal to or more than about 25. In certain embodiments, the first inorganic particulate material component has a steepness factor equal to or more than about 30. In certain embodiments, the first inorganic particulate material component has a steepness factor equal to or less than about 80. In certain embodiments, the first inorganic particulate material component has a steepness factor equal to or less than about 60. In certain embodiments, the first inorganic particulate material component has a steepness factor equal to or less than about 40.

In certain embodiments of any aspect of the present invention, wherein the composition comprises a first inorganic particulate material component having a first particle size distribution and a second inorganic particulate material component having a second particle size distribution, the second inorganic particulate material component has a steepness factor equal to or more than about 15. In certain embodiments, the second inorganic particulate material component has a steepness factor equal to or more than about 25. In certain embodiments, the second inorganic particulate material component has a steepness factor equal to or more than about 30. In certain embodiments, the second inorganic particulate material component has a steepness factor equal to or less than about 80. In certain embodiments, the second inorganic particulate material component has a steepness factor equal to or less than about 60. In certain embodiments, the second inorganic particulate material component has a steepness factor equal to or less than about 40.

In certain embodiments of any aspect of the present invention, wherein the composition comprises a first inorganic particulate material component having a first particle size distribution and a second inorganic particulate material component having a second particle size distribution, the first inorganic particulate material component has a $d_{50}$ ranging from about 0.1 µm to about 3.0 µm. In certain embodiments, the first inorganic particulate material component has a $d_{50}$ ranging from about 0.3 µm to about 2.0 µm. In certain embodiments, the first inorganic particulate material component has a $d_{50}$ ranging from about 0.3 µm to about 1.5 µm.

In certain embodiments of any aspect of the present invention, wherein the composition comprises a first inorganic particulate material component having a first particle size distribution and a second inorganic particulate material component having a second particle size distribution, the second inorganic particulate material component has a do ranging from about 0.1 µm to about 3.0 µm. In certain embodiments, the second inorganic particulate material has a $d_{50}$ ranging from about 0.1 µm to about 2.0 µm. In certain embodiments, the second inorganic particulate material has a $d_{50}$ ranging from about 0.1 µm to about 1.0 µm. In certain embodiments, the second inorganic particulate material has a $d_{50}$ ranging from about 0.1 µm to about 0.5 µm.

In certain embodiments of any aspect of the present invention, the composition further comprises a third inorganic particulate material component having a third particle size distribution. In certain embodiments, the third inorganic particulate material component has a steepness factor equal to or more than about 15. In certain embodiments, the third inorganic particulate material component has a steepness factor equal to or more than about 25. In certain embodiments, the third inorganic particulate material component has a steepness factor equal to or more than about 30. In certain embodiments, the third inorganic particulate material component has a steepness factor equal to or less than about 80. In certain embodiments, the third inorganic particulate material component has a steepness factor equal to or less than about 60. In certain embodiments, the third inorganic particulate material component has a steepness factor equal to or less than about 40.

In certain embodiments of any aspect of the present invention, wherein the composition comprises a first inorganic particulate material component having a first particle size distribution, a second inorganic particulate material component having a second particle size distribution and a third inorganic particulate material component having a third particle size distribution, the third calcium carbonate component has a $d_{50}$ ranging from about 0.1 µm to about 3.0 µm. In certain embodiments, the third inorganic particulate material component has a $d_{50}$ ranging from about 0.1 µm to about 2.5 µm. In certain embodiments, the third inorganic particulate material component has a $d_{50}$ ranging from about 0.1 µm to about 2.0 µm. In certain embodiments, the third inorganic particulate material component has a $d_{50}$ ranging from about 0.1 µm to about 1.5 µm.

In certain embodiments of any aspect of the present invention, the first and/or second and/or third inorganic particulate material component(s) each individually have a shape factor equal to or less than about 20. In certain embodiments, each of the first and/or second and/or third inorganic particulate material component(s) each individually have a shape factor equal to or less than about 10. In certain embodiments, each of the first and/or second and/or third inorganic particulate material component(s) each individually have a shape factor equal to or less than about 5.

In certain embodiments of any aspect of the present invention, wherein the composition comprises a first inorganic particulate material component having a first particle size distribution, a second inorganic particulate material component having a second particle size distribution, and optionally a third inorganic particulate material component having a third particle size distribution, the first inorganic particulate material component is present in the composition in an amount ranging from about 50 wt % to about 90 wt %. In certain embodiments, the first inorganic particulate material component is present in the composition in an amount ranging from about 55 wt % to about 85 wt %. In certain embodiments, the first inorganic particulate material component is present in the composition in an amount ranging from about 60 wt % to about 80 wt %.

In certain embodiments of any aspect of the present invention, wherein the composition comprises a first inorganic particulate material component having a first particle size distribution, a second inorganic particulate material component having a second particle size distribution, and optionally a third inorganic particulate material component having a third particle size distribution, the second inorganic particulate material component is present in the composition in an amount ranging from about 10 wt % to about 50 wt %. In certain embodiments, the second inorganic particulate material component is present in the composition in an amount ranging from about 15 wt % to about 45 wt %. In certain embodiments, the second inorganic particulate material component is present in the composition in an amount ranging from about 20 wt % to about 40 wt %.

In certain embodiments of any aspect of the present invention, wherein the composition comprises a first inorganic particulate material component having a first particle size distribution, a second inorganic particulate material component having a second particle size distribution, and a third inorganic particulate material component having a third particle size distribution, the third inorganic particulate material component is present in the composition in an amount ranging from about 5 wt % to about 30 wt %. In certain embodiments, the third inorganic particulate material component is present in the composition in an amount ranging from about 10 wt % to about 30 wt %. In certain embodiments, the third inorganic particulate material component is present in the composition in an amount ranging from about 15 wt % to about 30 wt %. In certain embodiments, the third inorganic particulate material component is present in the composition in an amount ranging from about 5 wt % to about 15 wt %.

In certain embodiments of any aspect of the present invention, the composition further comprises a fourth inorganic particulate material component. In certain embodiments of any aspect of the present invention, the composition further comprises a fifth inorganic particulate material component. In certain embodiments of any aspect of the present invention, the composition further comprises a sixth inorganic particulate material component.

In certain embodiments of the fifth and/or seventh aspects of the present invention, the barrier composition and/or paper coating composition comprises equal to or less than about 50 pph of binder. In certain embodiments, the barrier or paper coating composition comprises equal to or less than about 40 pph of binder. In certain embodiments, the barrier or paper coating composition comprises equal to or less than about 35 pph of binder. In certain embodiments, the binder is latex. In certain embodiments, the binder is polyvinyl alcohol.

In certain embodiments of the eighth or tenth aspect of the present invention, the product is in the form of paper, board, card, or paper board.

The details, examples and preferences provided in relation to any particular one or more of the stated aspects of the present invention apply equally to all aspects of the present invention. Any combination of the embodiments, examples and preferences described herein in all possible variations thereof is encompassed by the present invention unless otherwise indicated herein, or otherwise clearly contradicted by context.

DETAILED DESCRIPTION OF THE INVENTION

In certain embodiments of the present invention, at least an alternative composition comprising inorganic particulate material (e.g. calcium carbonate) is provided, which is suitable for use in a barrier coating composition or paper coating composition.

It has surprisingly been found that in certain embodiments, the compositions of the present invention demonstrate improved barrier properties in comparison to alternative compositions comprising inorganic particulate material. Without wishing to be bound by theory, it is thought that the compositions of the present invention show an increased level of packing in comparison to alternative compositions comprising inorganic particulate material, which may contribute to the barrier properties of said compositions.

Thus, in certain embodiments of the present invention, a composition comprising inorganic particulate material is provided which is advantageous in that it enables a reduced amount of binder to be used in a barrier coating and/or paper coating composition in comparison to an alternative composition comprising inorganic particulate material.

Compositions Comprising Calcium Carbonate

There is provided herein a composition comprising, consisting essentially of, or consisting of inorganic particulate material (e.g. calcium carbonate).

In certain aspects, the inorganic particulate material in the composition has a CPVC point of less than 29 pph binder (e.g. latex such as SBR latex).

In certain aspects, the composition is obtained by or is obtainable by a method comprising combining a first inorganic particulate material component having a first particle size distribution with a second inorganic particulate material component having a second particle size distribution. Optionally, the composition is obtained by or is obtainable by further combining a third inorganic particulate material component having a third particle size distribution with the first and/or second inorganic particulate material components. Optionally, the composition is obtained by or is obtainable by further combining a fourth, optionally a fifth, optionally a sixth inorganic particulate material component with the first and/or second and/or third inorganic particulate material components.

In certain embodiments of any aspect of the present invention, the composition is an aqueous suspension. In certain embodiments, the solids content of the aqueous suspension is from about 15% to about 80% by weight of the composition. For example, the solids content of the composition may be from about 50% to about 80% by weight, for example from about 60% to about 79% by weight, for example from about 65% to about 78% by weight of the composition.

In other embodiments of any aspect of the present invention, the composition is a dry mineral blend.

In certain embodiments, the composition may initially be in the form of an aqueous suspension and the aqueous suspension may then be treated to remove at least a portion or substantially all of the water to form a partially dried or essentially completely dried product. For example, at least about 10% by volume of water in the aqueous suspension may be removed from the aqueous suspension, for example, at least about 20% by volume, or at least about 30% by volume, or least about 40% by volume, or at least about 50% by volume, or at least about 60% by volume, or at least about 70% by volume or at least about 80% by volume or at least about 90% by volume, or at least about 100% by volume of water in the aqueous suspension may be removed. Any suitable technique can be used to remove water from the aqueous suspension including, for example, by gravity or vacuum-assisted drainage, with or without pressing, or by evaporation, or by filtration, or by a combination of these techniques. The partially dried or essentially completely dried product will comprise inorganic particulate material and any other optional additives that may have been added to the aqueous suspension prior to drying. The partially dried or essentially completely dried product may be stored or packaged for sale. The partially dried or essentially completely dried product may be optionally re-hydrated and incorporated in barrier coating compositions and paper coating compositions, as described herein.

In certain embodiments of any aspect of the present invention, the solids content of the composition consists essentially of or consists of inorganic particulate material, for example calcium carbonate. In other embodiments, the solids content of the composition comprises inorganic particulate material, for example calcium carbonate. In certain embodiments, the composition may further comprise other solids, such as other inorganic particulate materials. For example, the composition may further comprise one or more other inorganic particulate materials which are suitable for use as fillers in papermaking compositions.

In certain embodiments, for example when the inorganic particulate material (e.g. calcium carbonate) is obtained from naturally occurring sources, it may be that some mineral impurities will contaminate the ground material. For example, naturally occurring calcium carbonate occurs in association with other minerals. In general, however, the inorganic particulate material may contain less than about 5% by weight, for example less than about 3% by weight, for example less than about 2% by weight of other mineral impurities based on the total dry weight of inorganic particulate material in the composition. For example, the inorganic particulate material may contain less than about 1% by weight of other mineral impurities based on the total dry weight of inorganic particulate material in the composition.

Inorganic Particulate Material

Any inorganic particulate material capable of being provided in an aqueous suspension may be used in certain embodiments of the present invention. Suitable inorganic particulate materials may be selected from one or more of the following: alkaline earth metal carbonate (for example dolomite, i.e. $CaMg(CO_3)_2$), metal sulphate (for example gypsum), metal silicate, metal oxide (for example iron oxide, chromia, antimony trioxide or silica), metal hydroxide, wollastonite, bauxite, talc (for example, French chalk), mica, zinc oxide (for example, zinc white or Chinese white), silica, titanium dioxide (for example, anatase or rutile), zinc sulphide, calcium carbonate (for example whiting, precipitated calcium carbonate (PCC), ground calcium carbonate (GCC) or surface-modified calcium carbonate), barium sulphate (for example, barite, blanc fixe or process white), alumina hydrate (for example, alumina trihydrate, light alumina hydrate, lake white or transparent white), clay (for example kaolin, calcined kaolin, China clay or bentonite), and combinations thereof. The inorganic particulate material may be selected from any one or more of the materials listed. The at least one inorganic particulate material may comprise a blend of any combination of the listed materials. Hereinafter, embodiments of the present invention may tend to be discussed in terms of calcium carbonate. However, the invention should not be construed as being limited to such embodiments.

In certain embodiments of any aspect of the present invention, the calcium carbonate is, for example, ground calcium carbonate (GCC) or precipitated calcium carbonate (PCC). The calcium carbonate may, for example, be obtained from naturally occurring mineral sources, for example limestone, chalk, marble and travertine, for example by grinding. The PCC may also be ground. A combination of two or more calcium carbonates may be used. For example, a combination of ground calcium carbonate and precipitated calcium carbonate may be used. The combination of two or more calcium carbonates may be prepared by co-grinding.

The calcium carbonate may optionally be surface-modified. For example, the calcium carbonate may be coated. The coating may consist of, consist essentially of, or comprise a silane or any salt thereof, for example an organic silane. The alkaline earth metal carbonate may be coated with a fatty acid or salt thereof. For example, the alkaline earth metal carbonate may be coated with stearate. The level of coating may be about 0.1 to about 10 wt % based on the total weight of the coated particulate mineral additive, for example between about 0.1 and about 3 wt %, for example between about 0.5 or 0.6 or 0.7 or 0.8 and about 2.0 wt % e.g. about 1.5 wt %. The term "coating" used herein is to be understood broadly, and is not limited, for example, to uniform coatings or to coatings which cover the entire surface area of a particle. Particles in which discrete regions of the surface are modified with a coating will be understood as being coated within the terms of certain embodiments of the present invention.

Ground calcium carbonate (GCC) is typically obtained by grinding a mineral source such as chalk, marble or limestone, which may be followed by a particle size classification step, in order to obtain a product having the desired degree of fineness. The particulate solid material may be ground autogenously, i.e. by attrition between the particles of the solid material themselves, or alternatively, in the presence of a particulate grinding medium comprising particles of a different material from the calcium carbonate to be ground.

Wet grinding of calcium carbonate involves the formation of an aqueous suspension of the calcium carbonate which may then be ground, optionally in the presence of a suitable dispersing agent. Reference may be made to, for example, EP-A-614948 (the contents of which are incorporated by reference in their entirety) for more information regarding the wet grinding of calcium carbonate.

PCC may be used as the source of particulate calcium carbonate in certain embodiments of the present invention, and may be produced by any of the known methods available in the art. TAPPI Monograph Series No 30, "Paper Coating Pigments", pages 34-35 describes the three main commercial processes for preparing precipitated calcium carbonate which is suitable for use in preparing products for use in the paper industry, but may also be used in connection with the certain embodiments of the present invention. In all three processes, limestone is first calcined to produce quicklime, and the quicklime is then slaked in water to yield calcium hydroxide or milk of lime. In the first process, the milk of lime is directly carbonated with carbon dioxide gas. This process has the advantage that no by-product is formed, and it is relatively easy to control the properties and purity of the calcium carbonate product. In the second process, the milk of lime is contacted with soda ash to produce, by double decomposition, a precipitate of calcium carbonate and a solution of sodium hydroxide. The sodium hydroxide should be substantially completely separated from the calcium carbonate if this process is to be commercially attractive. In the third main commercial process, the milk of lime is first contacted with ammonium chloride to give a calcium chloride solution and ammonia gas.

The calcium chloride solution is then contacted with soda ash to produce, by double decomposition, precipitated calcium carbonate and a solution of sodium chloride.

The process for making PCC results in very pure calcium carbonate crystals and water. The crystals can be produced in a variety of different shapes and sizes, depending on the specific reaction process that is used. The three main forms of PCC crystals are aragonite, rhombohedral and scalenohedral, all of which are suitable for use in certain embodiments of the present invention, including mixtures thereof.

The inorganic particulate material in the composition may have a shape factor equal to or less than about 20. For example, the inorganic particulate material in the composition may have a shape factor equal to or less than about 15, for example equal to or less than about 12, for example equal to or less than about 10, for example equal to or less than about 7, for example equal to or less than about 5, for example equal to or less than about 2.

"Shape Factor", as used herein, is a measure of the ratio of particle diameter to particle thickness for a population of particles of varying size and shape. Unless otherwise stated, shape factor is measured using the electrical conductivity methods, apparatuses, and equations described in U.S. Pat. No. 5,576,617, which is incorporated herein by reference. As the technique for determining shape factor is further described in the '617 patent, the electrical conductivity of a composition of an aqueous suspension of orientated particles under test is measured as the composition flows through a vessel. Measurements of the electrical conductivity are taken along one direction of the vessel and along another direction of the vessel transverse to the first direction. Using the difference between the two conductivity measurements, the shape factor of the particulate material under test is determined.

Further Additives

The composition may comprise further additives. In particular, when the composition is in the form of an aqueous suspension, the composition may comprise further additives. For example, the composition may further comprise further additives selected from one or more dispersing agents, one or more biocides, one or more suspending aids, one or more thickening agents, one or more binders, one or more anti-settling agents one or more salts or one or more other additives.

For example, the one or more dispersing agent may be made from monomers and/or co-monomers selected from the group consisting of acrylic acid, methacrylic acid, itaconic acid, crotonic acid, fumaric acid, maleic anhydride acid, isocrotonic acid, aconitic acid (cis or trans), mesaconic acid, sinapinic acid, undecylenic acid, angelic acid, canellic acid, hydroxyacrylic acid, acrolein, acrylamide, acrylonitrile, dimethylaminoethyl methacrylate, vinylpyrrolidone, vinylcaprolactam, ethylene, propylene, isobutylene, diisobutylene, vinyl acetate, styrene, [alpha]-methyl styrene, methyl vinyl ketone, the esters of acrylic and methacrylic acids and mixtures thereof. The dispersing agent may, for example, be polyacrylic acid and/or polymethacrylic acid.

For example, the one or more biocides may be selected from a silver-based biocide, an aldehyde-releasing biocide, an aldehyde-based biocide, a phenolic biocide, an isothiazoline biocide, or any mixture thereof. The biocide may be selected from one or more of the following: formaldehyde, acetaldehyde, glyoxal, succinaldehyde, glutaraldehyde, 2-propenal, phthalic dialdehyde and mixtures thereof, and in certain embodiments is formaldehyde, glutaraldehyde, benzyl alcoholmono(poly)-hemiformal, ethyleneglycolhemiformal (EGHF), [1,2-Ethanediylbis(oxy)]-bis-methanol, tetrahydro-1,3,4,6-tetrakis(hydroxylmethyl)imidazo [4,5-d] imidazole-2,5 (1H,3H)-dione (also commonly referred to as TetraMethylolAcetyleneDiurea TMAD), orthophenylphenol (OPP), 2-methyl-4-isothiazoline-3-one (MIT), 5-chloro-2-methyl-2H-isothiazolin-3-one (CIT), 1,2-benzisothiazoline-3-one (BIT), or mixtures thereof.

For example, the thickening agent may be selected from polyurethanes, acrylic polymers, latex, styrene, butadiene, polyvinylalcohol, cellulose, cellulose-derived macromolecules, saccharides and organosilicones.

For example, the binder may be selected from any of the binders disclosed herein, including, for example, polyvinyl acetate, ethylene acetate or copolymers thereof.

Coating Pore Volume

Coating pore volume is a measure of the total amount of space between the particles in a material (i.e. volume not occupied by solid matter) and the volume within particles if the particle is porous. Unless otherwise stated, the coating pore volume of the inorganic particulate material in the composition is measured by first preparing a test composition comprising 100 pph of the inorganic particulate material and 5 pph binder (e.g., a paper coating latex such as SBR latex) and coating the sample onto a polymer substrate (e.g., using a standard coater to draw down the test composition onto the plastic). An approximately 0.5 g sample of the test composition is placed in an assembled glass dilatometer (measuring vessel) in a Thermoelectron (ThermoFisher) Mercury Porosimeter model Pascal 140, 240. This is subsequently taken down to near vacuum (0.02 kPa), filled with Mercury and re-pressurized slowly back to atmospheric pressure and greater until a final pressure of 190 MPa is achieved. Using software based on the Lucas-washburn equation, the intrusion of Mercury into the sample vs pressure can be translated into a pore size vs pore volume distribution. Software is also used to derive the pore volume (area under the graph) and the peak pore size across the pore size region specified above.

The inorganic particulate material in the composition may, for example, have a coating pore volume equal to or less than about 0.4 $cm^3g^{-1}$. For example, the inorganic particulate material in the composition may have a coating pore volume equal to or less than about 0.35 $cm^3g^{-1}$, for example equal to or less than about 0.3 $cm^3g^{-1}$, for example equal to or less than about 0.25 $cm^3g^{-1}$, for example equal to or less than about 0.2 $cm^3g^{-1}$, for example equal to or less than about 0.15 $cm^3g^{-1}$. The inorganic particulate material in the composition may, for example, have a coating pore volume equal to or less than about 0.14 $cm^3g^{-1}$, for example equal to or less than about 0.13 $cm^3g^{-1}$, for example equal to or less than about 0.12 $cm^3g^{-1}$. The inorganic particulate material in the composition may, for example, have a coating pore volume equal to or more than about 0.01 $cm^3g^{-1}$. For example, the inorganic particulate material in the composition may have a coating pore volume equal to or more than about 0.05 $cm^3g^{-1}$, for example equal to or more than about 0.1 $cm^3g^{-1}$. For example, the inorganic particulate material in the composition may have a coating pore volume ranging from about 0.01 $cm^3g^{-1}$ to about 0.4 $cm^3g^{-1}$, for example from about 0.01 $cm^3g^{-1}$ to about 0.15 $cm^3g^{-1}$, for example from about 0.1 $cm^3g^{-1}$ to about 0.14 $cm^3g^{-1}$.

Pore Size

Unless otherwise stated, the mean pore size of the inorganic particulate material in the composition is measured using a Thermoelectron (ThermoFisher) Mercury Porosimeter model Pascal 140, 240 as described above for measurement of coating pore volume. The inorganic particulate material in the composition may, for example, have a mean pore size equal to or less than about 1.1 μm. For example, the inorganic particulate material in the composition may have a mean pore size equal to or less than about 1.0 μm, for example equal to or less than about 0.9 μm, for example equal to or less than about 0.8 μm. The inorganic particulate material in the composition may, for example, have a mean pore size equal to or greater than about 0.01 μm, for example equal to or greater than about 0.05 μm, for example equal to or greater than about 0.1 μm. For example, the inorganic particulate material in the composition may have a mean pore size ranging from about 0.01 μm to about 1.1 μm, for example from about 0.05 μm to about 1.0 μm, for example from about 0.1 μm to about 0.9 μm.

Particle Size Distribution

Unless otherwise stated, the steepness factor is defined as the ratio of the $d_{30}$ equivalent spherical diameter (at which 30% by weight of the particles are finer) to the $d_{70}$ equivalent spherical diameter (at which 70% by weight of the particles are finer), multiplied by 100.

The parameter equivalent spherical diameter (esd) is measured in a well known manner by sedimentation of the particulate material in a fully dispersed condition in an aqueous medium using a Sedigraph 5100 machine as supplied by Micromeritics Instruments Corporation, Norcross, Ga., USA (telephone: +17706623620; web-site: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (e.s.d), less than given e.s.d values.

The steepness factor of the inorganic particulate material in the composition may be less than or equal to about 60. The steepness factor of the inorganic particulate material in the composition may, for example, be less than or equal to about 55, for example less than or equal to about 50, for example less than or equal to about 45, for example less than or equal to about 40, for example less than or equal to about 35, for example less than or equal to about 30. For example, the steepness factor of the inorganic particulate material in the composition may be less than or equal to about 28, for example less than or equal to about 27, for example less than or equal to about 26. The steepness factor of the inorganic particulate material in the composition may, for example, be less than or equal to about 25. For example, the steepness factor of the inorganic particulate material in the composition may be less than or equal to about 24, for example less than or equal to about 23, for example less than or equal to about 22, for example less than or equal to about 21.

The steepness factor of the inorganic particulate material in the composition may range from about 10 to about 60. For example, the steepness factor of the inorganic particulate material in the composition may range from about 10 to about 50, for example from about 10 to about 30, for example from about 10 to about 28, for example from about 10 to about 25, for example from about 10 to about 23. The steepness factor of the inorganic particulate material in the composition may, for example, range from about 20 to about 30, or from about 25 to about 35, for example from about 20 to about 25 or from about 25 to about 30.

In certain embodiments of any aspect of the present invention, the inorganic particulate material in the composition has a $d_{50}$ ranging from about 0.1 μm to about 3.0 μm. In certain embodiments, the inorganic particulate material in the composition has a $d_{50}$ ranging from about 0.1 μm to about 2.5 μm, for example from about 0.1 μm to about 2.0 μm. In certain embodiments, the inorganic particulate material in the composition has a $d_{50}$ ranging from about 0.2 μm to about 1.5 µm, for example from about 0.2 µm to about 1.0 µm, for example from about 0.2 µm to about 0.8 µm, for example from about 0.2 µm to about 0.6 µm.

Stain Length

Unless otherwise stated, stain length is measured by Dutch standard NEN 1836. Coating stain length and stain length refer to the length of an ink stain after spreading on a paper coating composition. A shorter stain length indicates that the coating is more absorbent or rough.

In certain embodiments of any aspect of the present invention, the composition is adapted to provide a coating having a stain length ranging from about 9 cm to about 12 cm. In certain embodiments, the composition provides a stain length ranging from about 9 cm to about 11 cm, for example from about 9 cm to about 10 cm.

CPVC Point

The critical pigment volume concentration (CPVC) point is the point where there is enough binder to completely surround the pigment and fill all the voids between the particles. A lower CPVC point indicates that less binder is required to fully bind the coating. Unless otherwise stated, the CPVC point of the composition is measured by drawing down a thin film (approximately 15 gsm wet) of a test composition comprising inorganic particulate material and a binder onto a black impermeable substrate. A spacer ring is placed on the surface to prevent wet coating colour from being transferred to the instrument and the coating is placed under a reflectometer. The reflectance is measured as a function of time until the film has dried. As the film dries, the particles in the coating become closer and reflect the light less efficiently and the reflectance decreases. If the test composition is fully bound (pigment is completely surrounded and all voids filled), then reflectance will reach a plateau when the film has dried. If the test composition is not fully bound then incorporation of air during drying will cause the reflectance to increase again. This test is repeated for test compositions comprising different amounts (by weight) of binder (relative to 100 pph inorganic particulate material by weight) until a test composition that is fully bound is found. Thus, the CPVC point may alternatively be referred to as the CPWC (critical pigment weight concentration) point.

The inorganic particulate material in the composition may have a CPVC point of less than or equal to about 29 pph binder (where the binder is added by weight (29 pph binder by weight with 100 pph pigment by weight). For example, the inorganic particulate material in the composition may have a CPVC point of less than or equal to about 28 pph binder, for example less than or equal to about 27 pph binder, for example less than or equal to about 26 pph binder. The inorganic particulate material in the composition may, for example, have a CPVC point of less than or equal to about 25 pph binder, less than or equal to about 24 pph binder, less than or equal to about 23 pph binder or less than or equal to about 22 pph binder, for example less than or equal to about 21 pph binder.

The inorganic particulate material in the composition may have a CPVC point ranging from about 5 pph to about 29 pph binder, for example from about 5 pph to about 28 pph binder. The inorganic particulate material in the composition may, for example, have a CPVC point ranging from about 5 pph binder to about 25 pph binder. The inorganic particulate material in the composition may have a CPVC point ranging from about 10 pph to about 25 pph binder, for example from about 10 pph to about 23 pph binder, for example from about 20 pph to about 25 pph binder.

In certain embodiments of any aspect of the present invention, the binder used to measure the CPVC point is a latex such as SBR latex. Alternatively, the binder used to measure CPVC point may be any one of the binders listed below in the section relating to barrier coating compositions and paper coating compositions.

OVTR

Unless otherwise stated, the OVTR of the composition is measured by coating a base paper, with a coating composition comprising 60 pph of the mineral composition with the remainder being a polyvinyl alcohol latex, at a coatweight of 7 to 10 gsm. The base paper may be pre-coated with up to 12 gsm of a pre-coating composition. The pre-coating composition may comprise calcium carbonate having at least 60% of particles smaller than 2 µm and less than 15 pph of latex. The coated paper product is first cut in to circles of diameter 62.5 mm. The coated paper samples are left in a fume cupboard overnight prior to testing. Approximately 8 ml of n-heptane or decane is placed in the bottom of a sealable beaker. The beaker is then covered by the coated paper samples with the coated side facing inwards and the edges are sealed. The beaker is then weighed accurately to 4 decimal places and this is taken as time zero. The sealed beakers are left to stand in the fume cupboard and reweighed every 1 or 2 hours. As the volatile material escapes through the board, this results in a weight loss (gsm per day). The test is carried out at 21° C. and 50% relative humidity. A lower OVTR indicates a lower oil vapour transmission rate and that better barrier properties are obtained.

In certain embodiments of any aspect of the present invention, the composition has an OVTR of less than about 70 gsm/day. In certain embodiments, the composition has an OVTR of less than about 65 gsm/day, for example less than about 60 gsm/day, for example less than about 55 gsm/day, for example less than about 50 gsm/day.

In certain embodiments of any aspect of the present invention, the composition has an OVTR ranging from about 10 gsm/day to about 70 gsm/day when measured using n-heptane. In certain embodiments, the composition has an OVTR ranging from about 10 gsm/day to about 65 gsm/day, for example from about 10 gsm/day to about 60 gsm/day, for example from about 10 gsm/day to about 55 gsm/day, for example from about 10 gsm/day to about 50 gsm/day when measured using n-heptane. In certain embodiments, the composition has an OVTR ranging from about 15 gsm/day to about 70 gsm/day, for example from about 15 gsm/day to about 65 gsm/day, for example from about 15 gsm/day to about 60 gsm/day, for example from about 15 gsm/day to about 55 gsm/day, for example from about 15 gsm/day to about 50 gsm/day when measured using n-heptane. In certain embodiments, the composition has an OVTR ranging from about 20 gsm/day to about 70 gsm/day, for example from about 20 gsm/day to about 65 gsm/day, for example from about 20 gsm/day to about 60 gsm/day, for example from about 20 gsm/day to about 55 gsm/day, for example from about 20 gsm/day to about 50 gsm/day when measured using n-heptane.

In certain embodiments of any aspect of the present invention, the composition has an OVTR ranging from about 0.5 gsm/day to about 70 gsm/day when measured using decane. For example, the composition may have an OVTR ranging from about 0.5 gsm/day to about 50 gsm/day or from about 0.5 gsm/day to about 40 gsm/day or from about 1 gsm/day to about 30 gsm/day or from about 1 gsm/day to about 20 gsm/day or from about 1 gsm/day to about 10 gsm/day or from about 1 gsm/day to about 8 gsm/day or from about 1 gsm/day to about 6 gsm/day or from about 1 gsm/day to about 5 gsm/day or from about 1 gsm/day to about 4 gsm/day or from about 1 gsm/day to about 3 gsm/day when measured using decane.

MVTR

In certain embodiments of any aspect of the present invention, the composition has an MVTR of less than about 50 gsm/day. In certain embodiments, the composition has an MVTR of less than about 45 gsm/day, for example less than about 40 gsm/day, for example less than about 35 gsm/day, for example less than about 30 gsm/day.

In certain embodiments of any aspect of the present invention, the composition has an MVTR ranging from about 1 gsm/day to about 50 gsm/day. In certain embodiments, the composition has an MVTR ranging from about 5 gsm/day to about 45 gsm/day, for example from about 10 gsm/day to about 40 gsm/day, for example from about 15 gsm/day to about 35 gsm/day, for example from about 20 gsm/day to about 30 gsm/day.

Unless otherwise stated, MVTR of the composition is measured in a corresponding manner to OVTR. The beaker contains silica gel instead of n-heptane or decane and the uncoated side faces inwards. The weight of the beaker is measured to 4 decimal places and taken at time zero. The test is carried out at 21° C. and 50% relative humidity over a number of days, with periodic measurements. A lower mass increase corresponds to a lower moisture transmission rate and so a better barrier to moisture.

Gurley Air Permeability

In certain embodiments, the composition has a Gurley air permeability equal to or greater than about 100,000 s. For example, the composition may have a Gurley air permeability up to about 200,000 s.

Unless otherwise stated, Gurley air permeability was measured using the method described in ISO 5636-5, TAPPI 460 om-11. The units of seconds correspond to the time for 100 ml of air to pass through, where a high number indicates low permeability. The base paper, coating composition and coatweight etc. used may be as described above for OVTR.

Kit Test

In certain embodiments, the composition has a Kit test value equal to or greater than about 10. For example, the composition may have a Kit test value equal to or greater than about 11 or equal to or greater than about 12 or equal to or greater than about 13 or equal to or greater than about 14 or equal to or greater than about 15. For example, the composition may have a Kit test value up to about 16.

Unless otherwise stated, Kit test value is measured using the test method outlined in TAPPI 559 pm-96 but extended to 16 reagent blends. The Kit test solutions are all blends of castor oil, toluene and n-heptane in varying levels. The Kit test solution numbered 1 contains the most castor oil and number 16 contains the most heptane. An intermediate numbered Kit test solution e.g. 8 is pipetted in drops on the surface of the coated paper then wiped away after 15 seconds. The test area is then examined for signs of penetration into the surface. Any penetration is termed as a failure and the test is repeated with the next lowest numbered solution until there is no penetration i.e. a pass. Conversely, if the initial test yields no penetration, then the next highest Kit test solution is tested until there is failure. The highest number of Kit test solution that does not cause failure is quoted as the Kit test value. The base paper, coating composition and coatweight etc. used may be as described above for OVTR.

Emtec Test

In certain embodiments, the composition has an Emtec test value equal to or greater than about 50 s. For example, the composition may have an Emtec test value equal to or greater than about 55 s or equal to or greater than about 60 s or equal to or greater than about 65 s or equal to or greater than about 70 s. For example, the composition may have an Emtec test value up to about 100 s or up to about 90 s or up to about 75 s or up to about 80 s.

Unless otherwise stated, Emtec test value is measured using an Emtec Penetration Dynamics Analyzer PDA.C 02. This measures the attenuation of ultrasound through a substrate over time as it is immersed in a liquid (e.g. water) from an initial 100% intensity. An intensity of 0% is set as the baseline running the test using just the tape that holds the sample in place. The attenuation is proportional to the absorption of the liquid into the substrate. The machine can be set at either 1 MHz (for board) or 2 MHz (for paper) and was run on the 'General' measure mode. The intensity can then be quoted after a certain time, or the time to reach a set intensity. The base paper, coating composition and coatweight etc. used may be as described above for OVTR.

Inorganic Particulate Material Components

In certain embodiments of any aspect of the present invention, the composition comprises a first inorganic particulate material component having a first particle size distribution and a second inorganic particulate material component having a second particle size distribution. In certain embodiments, the composition further comprises a third inorganic particulate material component having a third particle size distribution. In certain embodiments, the composition further comprises a fourth inorganic particulate material component having a fourth particle size distribution. In certain embodiments, the composition further comprises a fifth inorganic particulate material component having a fifth particle size distribution. In certain embodiments, the composition further comprises a sixth inorganic particulate material component having a sixth particle size distribution.

Each inorganic particulate material component may, for example, be any of the inorganic particulate materials described above. The first inorganic particulate material component may, for example, be calcium carbonate. The second inorganic particulate material component may, for example, be calcium carbonate. The third inorganic particulate material component may, for example, be calcium carbonate. The fourth inorganic particulate material component may, for example, be calcium carbonate. The fifth inorganic particulate material component may, for example, be calcium carbonate. The sixth inorganic particulate material component may, for example, be calcium carbonate. The first and second inorganic particulate material components may, for example, both be calcium carbonate. The first, second, third, fourth, fifth and sixth inorganic particulate material components (where present) may, for example, all be calcium carbonate.

The calcium carbonate may, for example, be ground calcium carbonate (GCC) or precipitated calcium carbonate (PCC). The calcium carbonate may, for example, be obtained from naturally occurring mineral sources, for example limestone, chalk, marble and travertine, for example by grinding. The PCC may also be ground. A combination of two or more calcium carbonates may be used. For example, a combination of ground calcium carbonate and precipitated calcium carbonate may be used. The combination of two or more calcium carbonates may be prepared by co-grinding.

The steepness factor of the total inorganic particulate material in the composition may, for example, be equal to or lower than the steepness factor of the inorganic particulate material component having the lowest steepness factor. The steepness factor of the inorganic particulate material in the composition may be as described above.

The steepness factor of the first inorganic particulate material component may be equal to or more than about 15. For example, the steepness factor of the first inorganic particulate material component may be equal to or more than about 20, for example equal to or more than about 25, for example equal to or more than about 27, for example equal to or more than about 30, for example equal to or more than about 32, for example equal to or more than about 35.

The steepness factor of the first inorganic particulate material component may be equal to or less than about 80. For example, the steepness factor of the first inorganic particulate material component may be equal to or less than about 70, for example equal to or less than about 60, for example equal to or less than about 50, for example equal to or less than about 45, for example equal to or less than about 40, for example equal to or less than about 35.

The steepness factor of the second inorganic particulate material component may be equal to or more than about 15. For example, the steepness factor of the second inorganic particulate material component may be equal to or more than about 20, for example equal to or more than about 25, for example equal to or more than about 27, for example equal to or more than about 30, for example equal to or more than about 32, for example equal to or more than about 35.

The steepness factor of the second inorganic particulate material component may be equal to or less than about 80. For example, the steepness factor of the second inorganic particulate material component may be equal to or less than about 70, for example equal to or less than about 60, for example equal to or less than about 50, for example equal to or less than about 45, for example equal to or less than about 40, for example equal to or less than about 35.

The steepness factor of the third inorganic particulate material component may be equal to or more than about 15. For example, the steepness factor of the third inorganic particulate material component may be equal to or more than about 20, for example equal to or more than about 25, for example equal to or more than about 27, for example equal to or more than about 30, for example equal to or more than about 32, for example equal to or more than about 35.

The steepness factor of the third inorganic particulate material component may be equal to or less than about 80. For example, the steepness factor of the third inorganic particulate material component may be equal to or less than about 70, for example equal to or less than about 60, for example equal to or less than about 50, for example equal to or less than about 45, for example equal to or less than about 40, for example equal to or less than about 35.

The steepness factor of the fourth, fifth and sixth inorganic particulate material components (where present) may, for example, be equal to or less than about 80. For example, the steepness factor of the fourth, fifth and sixth inorganic particulate material components (where present) may be equal to or less than about 70, for example equal to or less than about 60, for example equal to or less than about 50, for example equal to or less than about 45, for example equal to or less than about 40, for example equal to or less than about 35.

The steepness factor of the fourth, fifth and sixth inorganic particulate material components (where present) may be equal to or more than about 15. For example, the steepness factor of the fourth, fifth and sixth inorganic particulate material components (where present) may be equal to or more than about 20, for example equal to or more than about 25, for example equal to or more than about 27, for example equal to or more than about 30, for example equal to or more than about 32, for example equal to or more than about 35.

The $d_{50}$ of the first inorganic particulate material component may range from about 0.1 μm to about 3.0 μm. For example, the $d_{50}$ of the first inorganic particulate material component may range from about 0.1 μm to about 2.5 μm. for example from about 0.1 μm to about 2.0 μm. For example, the $d_{50}$ of the first inorganic particulate material component may range from about 0.3 μm to about 1.5 μm. The $d_{50}$ of the first inorganic particulate material component may, for example, range from about 0.3 μm to about 1.2 μm, for example from about 0.3 μm to about 1.0 μm, for example from about 0.3 μm to about 0.8 μm. The $d_{50}$ of the first inorganic particulate material component may range from about 0.5 μm to about 1.5 μm, for example from about 0.8 μm to about 1.5 μm, for example from about 1.0 μm to about 1.5 μm.

The $d_{50}$ of the second inorganic particulate material component may range from about 0.1 μm to about 3.0 μm. For example, the $d_{50}$ of the second inorganic particulate material component may range from about 0.1 μm to about 2.5 μm. for example from about 0.1 μm to about 2.0 μm. For example, the $d_{50}$ of the second inorganic particulate material component may range from about 0.1 μm to about 0.8 μm, for example from about 0.1 μm to about 0.5 μm. The $d_{50}$ of the second inorganic particulate material component may, for example, range from about 0.2 μm to about 0.5 μm, for example from about 0.2 μm to about 0.4 μm. The $d_{50}$ of the second inorganic particulate material component may range from about 0.3 μm to about 0.5 μm.

The $d_{50}$ of the third inorganic particulate material component may, for example, range from about 0.1 μm to about 3.0 μm, for example from about 0.1 μm to about 2.5 μm. For example, the $d_{50}$ of the third inorganic particulate material component may range from about 0.1 μm to about 2.0 μm, for example from about 0.1 μm to about 1.5 μm. For example $d_{50}$ of the third inorganic particulate material component may range from about 0.1 μm to about 1.0 μm, for example from about 0.1 μm to about 0.8 μm, for example from about 0.1 μm to about 0.5 μm, for example from about 0.3 μm to about 0.5 μm. For example, the $d_{50}$ of the third inorganic particulate material component may range from about 0.3 μm to about 1.5 μm, for example from about 0.5 μm to about 1.5 μm, for example from about 0.5 μm to about 1.0 μm.

The $d_{50}$ of the fourth, fifth and sixth inorganic particulate material components (where present) may, for example, range from about 0.1 μm to about 3.0 μm, for example from about 0.1 μm to about 2.5 μm, for example from about 0.1 μm to about 2.0 μm, for example from about 0.1 μm to about 1.5 μm. The $d_{50}$ of the fourth, fifth and sixth inorganic particulate material components (where present) may range from about 0.1 μm to about 1.0 μm, for example from about 0.1 μm to about 0.8 μm, for example from about 0.1 μm to about 0.5 μm, for example from about 0.3 μm to about 0.5 μm. For example, the $d_{50}$ of the fourth, fifth and sixth inorganic particulate material components (where present) may range from about 0.3 μm to about 1.5 μm, for example from about 0.5 μm to about 1.5 μm, for example from about 0.5 μm to about 1.0 μm.

The $d_{50}$ of the first inorganic particulate material component may be different to the $d_{50}$ of the second inorganic particulate material component. The $d_{50}$ of the third, fourth, fifth and/or sixth inorganic particulate material components, where present, may each individually be different from the $d_{50}$ of the other (first, second, third, fourth, fifth and/or sixth) inorganic particulate material components.

The first and/or second and/or third and/or fourth and/or fifth and/or sixth inorganic particulate material components (where present) may each individually have an shape factor equal to or less than about 20. For example, the first and/or second and/or third and/or fourth and/or fifth and/or sixth inorganic particulate material components (where present) may each individually have an shape factor equal to or less than about 17, for example equal to or less than about 15, for example equal to or less than about 12, for example equal to or less than about 10, for example equal to or less than about 7, for example equal to or less than about 5, for example equal to or less than about 2.

The first inorganic particulate material component may be present in the composition in an amount ranging from about 50 wt % to about 90 wt %. For example, the first inorganic particulate material component may be present in the composition in an amount ranging from about 55 wt % to about 85 wt %, for example from about 50 wt % to about 80 wt %, for example from about 50 wt % to about 75 wt %, for example from about 50 wt % to about 70 wt %, for example from about 50 wt % to about 65 wt %. The first inorganic particulate material component may, for example, be present in the composition in an amount ranging from about 60 wt % to about 90 wt %, for example from about 60 wt % to about 85 wt %, for example from about 60 wt % to about 80 wt %.

The second inorganic particulate material component may, for example, be present in the composition in an amount ranging from about 10 wt % to about 50 wt %. The second inorganic particulate material component may be present in the composition in an amount ranging from about 15 wt % to about 45 wt %, for example from about 20 wt % to about 50 wt %, for example from about 25 wt % to about 50 wt %, for example from about 30 wt % to about 50 wt %, for example from about 35 wt % to about 50 wt %. For example, the second inorganic particulate material component may be present in the composition in an amount ranging from about 10 wt % to about 40 wt %, for example from about 15 wt % to about 40 wt %, for example from about 20 wt % to about 40 wt %.

The third inorganic particulate material component may, for example, be present in the composition in an amount ranging from about 5 wt % to about 30 wt %. For example, the third inorganic particulate material component may be present in the composition in an amount ranging from about 10 wt % to about 30 wt %, for example from about 15 wt % to about 30 wt %, for example from about 20 wt % to about 30 wt %. For example, the third inorganic particulate material component may be present in the composition in an amount ranging from about 5 wt % to about 25 wt %, for example from about 5 wt % to about 20 wt %, for example from about 5 wt % to about 15 wt %.

The fourth, fifth and sixth inorganic particulate material components (where present) may, for example, each independently be present in the composition in an amount ranging from about 5 wt % to about 30 wt %. For example, the fourth, fifth and sixth inorganic particulate material components (where present) may each be present in the composition in an amount ranging from about 10 wt % to about 30 wt %, for example from about 15 wt % to about 30 wt %, for example from about 20 wt % to about 30 wt %. For example, the fourth, fifth and sixth inorganic particulate material components (where present) may each independently be present in the composition in an amount ranging from about 5 wt % to about 25 wt %, for example from about 5 wt % to about 20 wt %, for example from about 5 wt % to about 15 wt %.

In certain embodiments where, for example, the composition consists of first and second inorganic particulate material components, the minor component (component present in the smallest amount), may, for example, be present in an amount of at least about 10 wt %. For example, where the composition consists of a first and second inorganic particulate material components, the minor component may be present in an amount of at least about 15 wt %. For example, where the composition consists of a first and second inorganic particulate material components, the minor component may be present in an amount of at least about 20 wt %.

In certain embodiments where, for example, the composition consists of first, second and third inorganic particulate material components, the minor component (component present in the smallest amount) may, for example, be present in an amount of at least about 5 wt %. For example, where the composition consists of first, second and third inorganic particulate material components, the minor component may be present in an amount of at least about 10 wt %. For example, where the composition consists of first, second and third inorganic particulate material components, the minor component may be present in an amount of at least about 15 wt %. For example, where the composition consists of first, second and third inorganic particulate material components, the minor component may be present in an amount of at least about 20 wt %.

In certain embodiments where, for example, the composition consists of first, second, third and fourth inorganic particulate material components, the minor component (component present in the smallest amount) may, for example, be present in an amount of at least about 5 wt %. For example, where the composition consists of first, second, third and fourth inorganic particulate material components, the minor component may be present in an amount of at least about 10 wt %. For example, where the composition consists of first, second, third and fourth inorganic particulate material components, the minor component may be present in an amount of at least about 15 wt %. For example, where the composition consists of first, second, third and fourth inorganic particulate material components, the minor component may be present in an amount of at least about 20 wt %.

The weight % of each inorganic particulate material component present in the composition is the percentage mass of that particular inorganic particulate material component in the material on a dry basis.

The composition may, for example, comprise a first inorganic particulate material (e.g. calcium carbonate) component having a $d_{50}$ ranging from about 0.3 μm to about 0.5 μm in an amount ranging from about 70 wt % to about 90 wt %, and a second inorganic particulate material (e.g. calcium carbonate) component having a $d_{50}$ ranging from about 0.1 μm to about 0.4 μm in an amount ranging from about 10 wt % to about 30 wt %.

The composition may, for example, comprise a first inorganic particulate material (e.g. calcium carbonate) component having a $d_{50}$ ranging from about 0.3 μm to about 0.5 μm and a steepness factor ranging from about 30 to about 40, in an amount ranging from about 70 wt % to about 90 wt %, and a second inorganic particulate material (e.g. calcium carbonate) component having a $d_{50}$ ranging from about 0.1

μm to about 0.4 μm and a steepness factor ranging from about 30 to about 40, in an amount ranging from about 10 wt % to about 30 wt %.

The composition may, for example, comprise a first inorganic particulate material (e.g. calcium carbonate) component having a $d_{50}$ ranging from about 1.0 μm to about 1.5 μm in an amount ranging from about 70 wt % to about 90 wt %, and a second inorganic particulate material (e.g. calcium carbonate) component having a $d_{50}$ ranging from about 0.1 μm to about 0.5 μm in an amount ranging from about 10 wt % to about 30 wt %.

The composition may, for example, comprise a first inorganic particulate material (e.g. calcium carbonate) component having a $d_{50}$ ranging from about 1.0 μm to about 1.5 μm and a steepness factor ranging from about 25 to about 35 in an amount ranging from about 70 wt % to about 90 wt %, and a second inorganic particulate material (e.g. calcium carbonate) component having a $d_{50}$ ranging from about 0.1 μm to about 0.5 μm and a steepness factor ranging from about 30 to about 40, in an amount ranging from about 10 wt % to about 30 wt %.

The composition may, for example, comprise a first inorganic particulate material (e.g. calcium carbonate) component having a $d_{50}$ ranging from about 1.0 μm to about 1.5 μm in an amount ranging from about 60 wt % to about 80 wt %, a second inorganic particulate material (e.g. calcium carbonate) component having a $d_{50}$ ranging from about 0.1 μm to about 0.4 μm in an amount ranging from about 10 wt % to about 30 wt %, and a third inorganic particulate material (e.g. calcium carbonate) component having a $d_{50}$ ranging from about 0.4 μm to about 0.8 μm in an amount ranging from about 5 wt % to about 30 wt %.

The composition may, for example, comprise a first inorganic particulate material (e.g. calcium carbonate) component having a $d_{50}$ ranging from about 1.0 μm to about 1.5 μm and a steepness factor ranging from about 25 to about 35, in an amount ranging from about 60 wt % to about 80 wt %, a second inorganic particulate material (e.g. calcium carbonate) component having a $d_{50}$ ranging from about 0.1 μm to about 0.4 μm and a steepness factor ranging from about 30 to about 40, in an amount ranging from about 10 wt % to about 30 wt %, and a third inorganic particulate material (e.g. calcium carbonate) component having a $d_{50}$ ranging from about 0.4 μm to about 0.8 μm and a steepness factor ranging from about 30 to about 40, in an amount ranging from about 5 wt % to about 30 wt %.

The composition may, for example, comprise a first inorganic particulate material (e.g. calcium carbonate) component having a $d_{50}$ ranging from about 1.0 μm to about 1.5 μm in an amount ranging from about 30 wt % to about 50 wt %, a second inorganic particulate material (e.g. calcium carbonate) component having a $d_{50}$ ranging from about 0.8 μm to about 1.2 μm in an amount ranging from about 20 wt % to about 40 wt %, and a third inorganic particulate material (e.g. calcium carbonate) component having a $d_{50}$ ranging from about 0.1 μm to about 0.5 μm in an amount ranging from about 20 wt % to about 40 wt %.

The composition may, for example, comprise a first inorganic particulate material (e.g. calcium carbonate) component having a $d_{50}$ ranging from about 1.0 μm to about 1.5 μm and a steepness factor ranging from about 25 to about 35, in an amount ranging from about 30 wt % to about 50 wt %, a second inorganic particulate material (e.g. calcium carbonate) component having a $d_{50}$ ranging from about 0.8 μm to about 1.2 μm and a steepness factor ranging from about 25 to about 35, in an amount ranging from about 20 wt % to about 40 wt %, and a third inorganic particulate material (e.g. calcium carbonate) component having a $d_{50}$ ranging from about 0.1 μm to about 0.5 μm and a steepness factor ranging from about 30 to about 40, in an amount ranging from about 20 wt % to about 40 wt %.

The composition may, for example, comprise a first inorganic particulate material (e.g. calcium carbonate) component having a $d_{50}$ ranging from about 1.0 μm to about 1.5 μm in an amount ranging from about 20 wt % to about 40 wt %, a second inorganic particulate material (e.g. calcium carbonate) component having a $d_{50}$ ranging from about 0.8 μm to about 1.2 μm in an amount ranging from about 10 wt % to about 30 wt %, a third inorganic particulate material (e.g. calcium carbonate) component having a $d_{50}$ ranging from about 0.3 μm to about 0.7 μm in an amount ranging from about 10 wt % to about 30 wt %, and a fourth inorganic particulate material (e.g. calcium carbonate) component having a $d_{50}$ ranging from about 0.1 μm to about 0.5 μm, in an amount ranging from about 20 wt % to about 40 wt %.

The composition may, for example, comprise a first inorganic particulate material (e.g. calcium carbonate) component having a $d_{50}$ ranging from about 1.0 μm to about 1.5 μm and a steepness factor ranging from about 25 to about 35, in an amount ranging from about 20 wt % to about 40 wt %, a second inorganic particulate material (e.g. calcium carbonate) component having a $d_{50}$ ranging from about 0.8 μm to about 1.2 μm and a steepness factor ranging from about 25 to about 35, in an amount ranging from about 10 wt % to about 30 wt %, and a third inorganic particulate material (e.g. calcium carbonate) component having a $d_{50}$ ranging from about 0.3 μm to about 0.7 μm and a steepness factor ranging from about 30 to about 40, in an amount ranging from about 10 wt % to about 30 wt %, and a fourth inorganic particulate material (e.g. calcium carbonate) component having a $d_{50}$ ranging from about 0.1 μm to about 0.5 μm and a steepness factor ranging from about 30 to about 40, in an amount ranging from about 20 wt % to about 40 wt %.

The composition may, for example, comprise a first inorganic particulate material (e.g. calcium carbonate) component having a $d_{50}$ ranging from about 1.70 μm to about 2.30 μm in an amount ranging from about 30 wt % to about 50 wt %, a second inorganic particulate material (e.g. calcium carbonate) component having a $d_{50}$ ranging from about 0.8 μm to about 1.2 μm in an amount ranging from about 20 wt % to about 40 wt %, and a third inorganic particulate material (e.g. calcium carbonate) component having a $d_{50}$ ranging from about 0.1 μm to about 0.5 μm in an amount ranging from about 20 wt % to about 40 wt %.

The composition may, for example, comprise a first inorganic particulate material (e.g. calcium carbonate) component having a $d_{50}$ ranging from about 1.70 μm to about 2.30 μm and a steepness factor ranging from about 25 to about 35, in an amount ranging from about 30 wt % to about 50 wt %, a second inorganic particulate material (e.g. calcium carbonate) component having a $d_{50}$ ranging from about 0.8 μm to about 1.2 μm and a steepness factor ranging from about 25 to about 35, in an amount ranging from about 20 wt % to about 40 wt %, and a third inorganic particulate material (e.g. calcium carbonate) component having a $d_{50}$ ranging from about 0.1 μm to about 0.5 μm and a steepness factor ranging from about 30 to about 40, in an amount ranging from about 20 wt % to about 40 wt %.

Method for Making a Composition Comprising Inorganic Particulate Material

There is provided herein a method for making a composition comprising inorganic particulate material, the method comprising combining a first inorganic particulate material (e.g. calcium carbonate) component having a first particle size distribution with a second inorganic particulate material (e.g. calcium carbonate) component having a second particle size distribution, and optionally further combining a third inorganic particulate material (e.g. calcium carbonate) component having a third particle size distribution with the first and/or second inorganic particulate material (e.g. calcium carbonate) component.

The method provided herein is for making any of the compositions disclosed herein. The compositions disclosed herein include not only the first and third aspects of the present invention, but also any of the embodiments disclosed herein, including any combination of these embodiments in all possible variations thereof.

A composition comprising inorganic particulate material such as calcium carbonate, for example an aqueous suspension or dry mineral blend, may be prepared by any method known to those skilled in the art.

Each inorganic particulate material (e.g. calcium carbonate) component may be provided in the form of an aqueous suspension and the aqueous suspensions may be blended together to form the final composition.

Each inorganic particulate material (e.g. calcium carbonate) component may be added to a stirred media mill with water and any additional optional additives such as dispersants, thickeners, biocides and anti-settling agents. The content may be stirred at high speed for a predetermined length of time to give a particle size distribution. The resultant mineral suspension may be separated from the media using screens. The aqueous suspension may then be treated to remove at least a portion or substantially all of the water to form a partially dried or essentially completely dried product. Any suitable technique can be used to remove water from the aqueous suspension including, for example, by gravity or vacuum-assisted drainage, with or without pressing, or by evaporation, or by filtration, or by a combination of these techniques.

Alternatively, each inorganic particulate material (e.g. calcium carbonate) component may be provided in the form of a dry mineral and the dry minerals may be blended using mixing techniques known in the art.

Use of the Compositions Comprising Inorganic Articulate Material

There is provided herein a use of any of the compositions disclosed herein in any one or more of coating compositions (for example barrier coating compositions or for example paper coating compositions), plastics, paints and sealants. The use of any of the compositions disclosed herein in any one or more of these applications may, for example, reduce the amount of binder and/or plastic required in that composition. This may, for example, be due to the tightly packed nature of the particles in the compositions disclosed herein.

There is provided herein a use of any of the compositions disclosed herein in a barrier coating composition. In particular, there is provided herein a use of any of the compositions disclosed herein in a paper coating composition. Further provided herein is a barrier coating composition and/or a paper coating composition comprising any of the compositions disclosed herein. A product coated with said barrier coating composition or paper coating composition is also provided herein.

The term barrier coating composition is intended to include, for example, paper coating compositions and compositions that are coated onto any substrate to provide coating holdout (i.e. the coating components do not absorb into the substrate).

In certain embodiments, the barrier coating compositions and paper coating compositions disclosed herein comprise a binder and a composition comprising inorganic particulate material (e.g. calcium carbonate). In certain embodiments, the barrier coating compositions and paper coating compositions comprise a composition comprising inorganic particulate material (e.g. calcium carbonate) as disclosed herein.

The composition comprising inorganic particulate material (e.g. calcium carbonate) disclosed herein includes any aspect of the present invention, including any of the embodiments disclosed herein and any combination of these embodiments in all possible variations thereof.

The barrier coating composition or paper coating composition may, for example, comprise at least about 20 wt % inorganic particulate material. For example, the barrier coating composition or paper coating composition may comprise at least about 30 wt % inorganic particulate material, for example at least about 40 wt % inorganic particulate material, for example at least about 50 wt % inorganic particulate material. The barrier coating composition or paper coating composition may, for example, comprise up to about 80 wt % inorganic particulate material, for example up to about 70 wt % inorganic particulate material.

The barrier coating composition or paper coating composition may, for example comprise at least about 20 wt % binder. For example, the barrier coating composition or paper coating composition may comprise at least about 30 wt % binder, for example at least about 40 wt % binder, for example at least about 50 wt % binder. The barrier coating composition or paper coating composition may, for example, comprise up to about 80 wt % binder, for example up to about 70 wt % binder.

The solids content of the barrier coating composition and/or paper coating composition may be from about 15% by weight to about 80% by weight, for example from about 60% by weight to about 79% by weight, for example from about 65% by weight to about 87% by weight of the coating composition. The solids content of the barrier coating composition and/or paper coating composition may be as high as possible but still giving a suitably fluid composition which may be used in coating. After application onto the substrate, the coating composition may be allowed to dry, thus forming a dry coating composition which coats the substrate.

Examples of suitable binders include starch, latex and proteinaceous adhesives.

Starch may suitably be derived from a natural starch, e.g., natural starch obtained from a known plant source, for example, wheat, maize, potato or tapioca. Where starch is employed as a binder ingredient, the starch may be employed in an unmodified and/or modified form. An example of a suitable unmodified starch is Pearl starch. Where starch is employed as a binder ingredient in a modified form, the starch may suitably be modified by one or more chemical treatments known in the art. The starch may, for example, be oxidized to convert some of its —$CH_2OH$ groups to —COOH groups. In some cases the starch may have a small proportion of acetyl, —$COCH_3$, groups. Alternatively, the starch may be chemically treated to render it cationic or amphoteric, i.e., with both cationic and anionic charges. The starch may also be converted to a starch ether, or hydroxyalkylated starch by replacing some —OH groups with, for example, —$OCH_2CH_2OH$ groups, —$OCH_2CH_3$ groups or —$OCH_2CH_2CH_2OH$ groups. A further class of chemically treated starches which may be used is that known as the starch phosphates. Alternatively, the raw starch may be hydrolyzed by means of a dilute acid or an enzyme to produce a gum of the dextrin type.

Latex may comprise for example a styrene butadiene rubber latex, acrylic polymer latex, polyvinyl acetate latex, ethylene acetate latex, polyvinyl alcohol latex, ethylene acrylic latex, styrene acrylic copolymer latex or copolymers thereof. For example, latex may comprise an ethylene acrylic acid copolymer.

Proteinaceous adhesives may comprise for example, casein or soy protein.

Any of the above binders and binder types may be used alone or in admixture with each other and/or with other binders, if desired.

The barrier coating compositions and paper coating compositions disclosed herein may suitably comprise one or more further additives selected from, for example, one or more cross-linkers, one or more water retention aids, one or more viscosity modifiers, one or more thickeners, one or more lubricity/calendaring aids, one or more dispersants, one or more antifoamers/defoamers, one or more dry or wet pick improvement additives, one or more dry or wet rub improvement and/or abrasion resistance additives, one or more gloss-ink hold-out additives, one or more optical brightening agents (OBA) and/or fluorescent whitening agents (FWA), one or more dyes, one or more biocides/spoilage control agents, one or more levelling and evening aids, one or more grease and oil resistance additives, one or more water resistance additives, one or more additional pigments, and any combination thereof.

Crosslinkers may be used in amounts of up to about 5% by weight, and include, for example, glyoxal, melamine formaldehyde resins, ammonium zirconium carbonates.

Water retention aids may be used in amounts up to about 2% by weight, and include, for example, sodium carboxymethyl cellulose, hydroxyethyl cellulose, PVOH (polyvinyl alcohol), starches, proteins, polyacrylates, gums, alginates, polyacrylamide bentonite and other commercially available products sold for such applications.

Viscosity modifiers and/or thickeners may be used in amounts up to about 2% by weight, and include, for example, acrylic associative thickeners, polyacrylates, emulsion, copolymers, dicyanamide, triols, polyoxyethylene ether, urea, sulphate castor oil, polyvinyl pyrrolidone, CMC (carboxymethyl celluloses, for example sodium carboxymethyl cellulose), sodium alginate, xanthan gum, sodium silicate, acrylic acid copolymers, HMC (hydroxymethyl celluloses), HEC (hydroxyethyl celluloses) and others.

Lubricity/calendaring aids may be used in amounts up to about 2% by weight, and include, for example, calcium stearate, ammonium stearate, zinc stearate, wax emulsions, waxes, alkyl ketene dimer, glycols.

Dispersants may be used in amounts up to about 2% by weight, and include, for example, polyelectrolytes such as polyacrylates and copolymers containing polyacrylate species, especially polyacrylate salts (e.g., sodium and aluminium optionally with a group 11 metal salt), sodium hexametaphosphates, non-ionic polyol, polyphosphoric acid, condensed sodium phosphate, non-ionic surfactants, alkanolamine and other reagents commonly used for this function.

Antifoamers/defoamers may be used in amounts up to about 1% by weight, and include, for example, blends of surfactants, tributyl phosphate, fatty polyoxyethylene esters plus fatty alcohols, fatty acid soaps, silicone emulsions and other silicone containing compositions, waxes and inorganic particulates in mineral oil, blends of emulsified hydrocarbons and other compounds sold commercially to carry out this function. Dry or wet pick improvement additives may be used in amounts up to about 2% by weight, and include, for example, melamine resin, polyethylene emulsions, urea formaldehyde, melamine formaldehyde, polyamide, calcium stearate, styrene maleic anhydride and others.

Dry or wet rub improvement and/or abrasion resistance additives may be used in amounts up to about 2% by weight, and include, for example, glyoxal based resins, oxidised polyethylenes, melamine resins, urea formaldehyde, melamine formaldehyde, polyethylene wax, calcium stearate and others.

Gloss-ink hold-out additives may be used in amounts up to about 2% by weight, and include, for example, oxidised polyethylenes, polyethylene emulsions, waxes, casein, guar gum, CMC, HMC, calcium stearate, ammonium stearate, sodium alginate and others.

Optical brightening agents (OBA) and/or fluorescent whitening agents (FWA) may be used in amounts up to about 1% by weight, and include, for example, stilbene derivatives.

Biocides/spoilage control agents may be used in amounts up to about 1% by weight, and include, for example, the biocides described herein including silver-based compounds, metaborate, sodium dodecylbenene sulphonate, thiocyanate, organosulphur, sodium benzonate and other compounds sold commercially for this function, e.g., the range of biocide polymers sold by Nalco.

Levelling and evening aids may be used in amounts up to about 2% by weight, and include, for example, non-ionic polyol, polyethylene emulsions, fatty acid, esters and alcohol derivatives, alcohol/ethylene oxide, sodium CMC, HEC, alginates, calcium stearate and other compounds sold commercially for this function.

Grease and oil resistance additives may be used in amounts up to about 2% by weight, and include, for example, oxidised polyethylenes, latex, SMA (styrene maleic anhydride), polyamide, waxes, alginate, protein, CMC, HMC.

Water resistance additives may be used in amounts up to about 2% by weight, and include, for example, oxidised polyethylenes, ketone resin, anionic latex, polyurethane, SMA, glyoxal, melamine resin, urea formaldehyde, melamine formaldehyde, polyamide, glyoxal, stearates and other materials commercially available for this function.

For all of the above additives, the percentages by weight quoted are based on the dry weight of pigment (100%) present in the composition. Where the additive is present in a minimum amount the minimum amount may be about 0.01% by weight based on the dry weight of pigment.

The barrier coating compositions or paper coating compositions disclosed herein may, for example, have an improved pick strength in comparison to barrier coating compositions or paper coating compositions comprising an alternative inorganic particulate material (e.g. alternative calcium carbonate). For example, the barrier coating compositions or paper coating compositions disclosed herein may be used to prepare a paper having a stronger dry pick. The barrier coatings or paper coatings made using the barrier coating and paper coating compositions disclosed herein may, for example, be stronger than barrier coatings or paper coatings comprising an alternative inorganic particulate material (e.g. alternative calcium carbonate). For example, the barrier coatings or paper coatings made using the barrier coating and paper coating compositions disclosed herein may crack less than barrier coatings or paper coatings comprising an alternative inorganic particulate material (e.g. alternative calcium carbonate). The barrier coating compositions and paper coating compositions disclosed herein may be used to prepare a substrate (e.g. a paper) that is whiter than a substrate (e.g. paper) prepared using barrier coating or paper coating compositions comprising an alternative inorganic particulate material (e.g. alternative calcium carbonate). Without wishing to be bound by theory, these advantageous properties (and any other advantageous property disclosed herein) may, for example, be due to increased packing of the particles of inorganic particulate material.

The compositions comprising inorganic particulate material disclosed herein can be incorporated into barrier coating compositions, which in turn can be used to prepare coated products. The coated products prepared using the barrier coating compositions disclosed herein may include coated plastic, for example a coated plastic film such as polyethylene, polypropylene and the like, or coated metal, for example coated metal foil such as aluminium foil. The substrate may be coloured, treated (e.g., varnished or laminated), or both.

In particular, the barrier coating compositions and paper coating compositions disclosed herein may be used to prepare coated paper products. In certain embodiments, the coating of the product comprises a dry residue of the composition comprising inorganic particulate material (e.g. calcium carbonate).

The term paper product, as used in connection with the present invention, should be understood to mean all forms of paper, including board, such as, for example, white-lined board and linerboard, cardboard, paperboard, coated board, and the like. There are numerous types of paper, coated or uncoated, which may be made using the compositions disclosed herein, including paper suitable for food packaging, perishable goods other than food, e.g., pharmaceutical products and compositions, books, magazines, newspapers and the like, and office papers. The paper may be calendered or super calendared as appropriate; for example super calendered magazine paper for rotogravure and offset printing may be made according to the present methods. Paper suitable for light weight coating (LWC), medium weight coating (MWC) or machine finished pigmentisation (MFP) may also be made according to the present methods. The paper coating compositions may, for example, be used to prepare label paper. The paper coating compositions may, for example, be used to prepare silicone release paper.

In certain embodiments, the paper substrate has opposing first and second surfaces. The barrier coating composition may be coated on the first surface, the second surface, or both. For example, the first surface may be a surface which faces the interior of the paper product when it is formed into a three-dimensional product and the opposing second surface may face the exterior of the paper product. The first and/or second surfaces may have other intermediary coatings or layers between each surface and the barrier coating.

In certain embodiments, the barrier coating compositions and paper coating compositions disclosed herein are used in speciality papers where low porosity is required, such as silicone hold out and label papers.

In certain embodiments, the barrier coating compositions and paper coating compositions disclosed herein are used to make paper products which do not require the highest level of brightness and/or gloss and/or opacity. For example, in certain embodiments, the barrier coating compositions and paper coating compositions disclosed herein are used to make label papers.

Method for Making a Paper Coating Composition

There is provided herein a method for making a paper coating composition comprising combining a composition comprising inorganic particulate material (e.g. calcium carbonate) with a binder.

The compositions which may be made according to the presently disclosed method include not only the first and third aspects of the present invention, but also any of the embodiments disclosed herein, including any combination of these embodiments in all possible variations thereof.

In certain embodiments, the method comprises combining, for example mixing, the inorganic particulate material (e.g. calcium carbonate) and the binder in an aqueous liquid medium to prepare a suspension of the solid components therein. For example, the method may comprise combining, for example mixing, the inorganic particulate material in an aqueous liquid medium to prepare a composition comprising inorganic particulate material as disclosed herein, and further combining, for example mixing, the binder with the suspension of inorganic particulate material. For example, the method may comprise combining the inorganic particulate material in an aqueous liquid medium with a binder in an aqueous liquid medium. For example, the initial composition comprising inorganic particulate material may be prepared as described above.

The barrier coating composition and/or paper coating composition may suitably be prepared by conventional mixing techniques, as will be well known to one of ordinary skill in the art.

Method for Making a Coated Product

There is provided herein a method for making a coated product, comprising providing a product to be coated and coating the product with a composition comprising inorganic particulate material (e.g. calcium carbonate).

The compositions disclosed herein include any aspect of the present invention, including any of the embodiments disclosed herein and any combination of these embodiments in all possible variations thereof.

In certain embodiments, the product to be coated is a paper product, which should be understood to mean all forms of paper as described above.

In a typical papermaking process, a fibrous pulp is prepared by any suitable chemical or mechanical treatment, or combination thereof, which are well known in the art. For example, the fibrous pulp may be formed in a grinder vessel or homogenizer. The aqueous environment of the grinder vessel or homogenizer may facilitate the formation of a pulp. Grinding may suitably be performed in a conventional manner. The grinding may, for example, be an attrition grinding process in the presence of a particulate grinding medium, or may be an autogenous grinding process (i.e., one in the absence of grinding medium). By grinding medium is meant a medium which is co-ground with the fibrous substrate. The fibrous pulp may be derived from any suitable source, such as wood, grasses (e.g., sugarcane, bamboo) or rags (e.g., textile waste, cotton, hemp or flax). The fibrous substrate may comprise recycled pulp. The pulp may be bleached in accordance with processes which are well known to those skilled in the art and those processes suitable for use in the present invention will be readily evident. The bleached cellulose pulp may be beaten, refined, or both, to a predetermined freeness (reported in the art as Canadian standard freeness (CSF) in $cm^3$). A suitable paper stock may then be prepared from the bleached and beaten pulp.

The fibrous pulp may comprise further additives such as one or more inorganic fillers, one or more retention aids (e.g., non-ionic, cationic or anionic retention aid or a microparticle retention aid), one or more sizing agents (e.g., a long chain alkylketene dimer, a wax emulsion or a succinic acid derivative), one or more dry and/or wet strength aids (e.g. starch or epichlorhydrin copolymers) and/or one or more dyes.

The coating process may be carried out using standard techniques which are well known to the skilled person. The coating process may also involve calendaring or super-calendaring the coated product.

Methods of coating paper and other sheet materials, and apparatus for performing the methods, are widely published and well known. Such known methods and apparatus may conveniently be used for preparing coated paper. For example, there is a review of such methods published in Pulp and Paper International, May 1994, page 18 et seq. Sheets may be coated on the sheet forming machine, i.e., "on-machine," or "off-machine" on a coater or coating machine. Use of high solids compositions is desirable in the coating method because it leaves less water to evaporate subsequently. However, as is well known in the art, the solids level should not be so high that high viscosity and levelling problems are introduced. The methods of coating may be performed using an apparatus comprising (i) an application for applying the coating composition to the material to be coated and (ii) a metering device for ensuring that a correct level of coating composition is applied. When an excess of coating composition is applied to the applicator, the metering device is downstream of it. Alternatively, the correct amount of coating composition may be applied to the applicator by the metering device, e.g., as a film press. At the points of coating application and metering, the paper web support ranges from a backing roll, e.g., via one or two applicators, to nothing (i.e., just tension). The time the coating is in contact with the paper before the excess is finally removed is the dwell time—and this may be short, long or variable. The coating may added by a coating head at a coating station. According to the quality desired, paper grades are uncoated, single-coated, double-coated and even triple-coated. When providing more than one coat, the initial coat (precoat) may have a cheaper formulation and optionally coarser pigment in the coating composition. A coater that is applying coating on each side of the paper will have two or four coating heads, depending on the number of coating layers applied on each side. Most coating heads coat only one side at a time, but some roll coaters (e.g., film presses, gate rolls, and size presses) coat both sides in one pass.

Examples of known coaters which may be employed include, without limitation, air knife coaters, blade coaters, rod coaters, bar coaters, multi-head coaters, roll coaters, roll or blade coaters, cast coaters, laboratory coaters, gravure coaters, kisscoaters, liquid application systems, reverse roll coaters, curtain coaters, spray coaters and extrusion coaters.

Water may be added to the solids comprising the barrier coating composition or paper coating composition to give a concentration of solids which is preferably such that, when the composition is coated onto a sheet to a desired target coating weight, the composition has a rheology which is suitable to enable the composition to be coated with a pressure (i.e., a blade pressure) of between 1 and 1.5 bar.

In one embodiment, the barrier coating is printed on the paper product, e.g., printed on a surface of the fibrous substrate of the paper product. The printing may utilize a technique selected from offset printing, flexographic printing or rotogravure printing, thereby allowing the barrier coating composition or paper coating composition to be applied to areas where it is required.

Offset printing is a widely used printing technique, as will be well understood by a person of ordinary skill in the art. The barrier coating composition or paper coating composition is transferred (or "offset") from a plate to a rubber blanket, then to the surface of the substrate (e.g., paper substrate). The substrate may be sheet-fed or web-fed. The web-fed process may be heatset or coldset. Flexographic printing is a widely used printing technique, as will be well understood by a person of ordinary skill in the art. Using this technique, the barrier coating composition or paper coating composition is transferred from a first roll which is partially immersed in a tank comprising the barrier coating composition. The barrier coating composition or paper coating composition is then transferred to the anilox roll (or meter roll) whose texture holds a specific amount of the barrier coating composition or paper coating composition since it is covered with thousands of small wells or cups that enable it to meter the barrier coating composition to the printing plate in a uniform thickness evenly and quickly. The substrate is finally sandwiched between the plate and the impression cylinder to transfer the barrier coating or paper coating. The coated substrate is then fed through a dryer, which allows the coating to dry. Advantageously, flexographic printing enables the barrier coating composition or paper coating composition to be applied in a series of thin layers (e.g., a series of fiver layers with a total coat weight of about 5 gsm) which has sufficient hold out to maintain good barrier properties (to liquid and/or vapour mineral oil transmission) for barrier coating compositions comprising greater than about 60% by weight, for example, greater than about 65% by weight of inorganic particulate, based on the total dry weight of the composition. Rotogravure printing is a widely used printing technique, as will be well understood by a person of ordinary skill in the art.

The total coat weight of the coating may be from about 1 to about 30 gsm. For example, from about 1 to about 20 gsm, for example, from about 1 to about 15 gsm, for example, from about 2 to about 10 gsm, for example, from about 3 to about 10 gsm, for example, from about 4 to about 10 gsm, for example, from about 4 to about 8 gsm or for example, from about 5 to about 8 gsm.

BRIEF DESCRIPTION OF THE DRAWINGS

Certain embodiments of the invention will now be described, by way of example only and without limitation, with reference to the following Figures and Examples, in which.

EXAMPLES

Example 1

Figure 1:
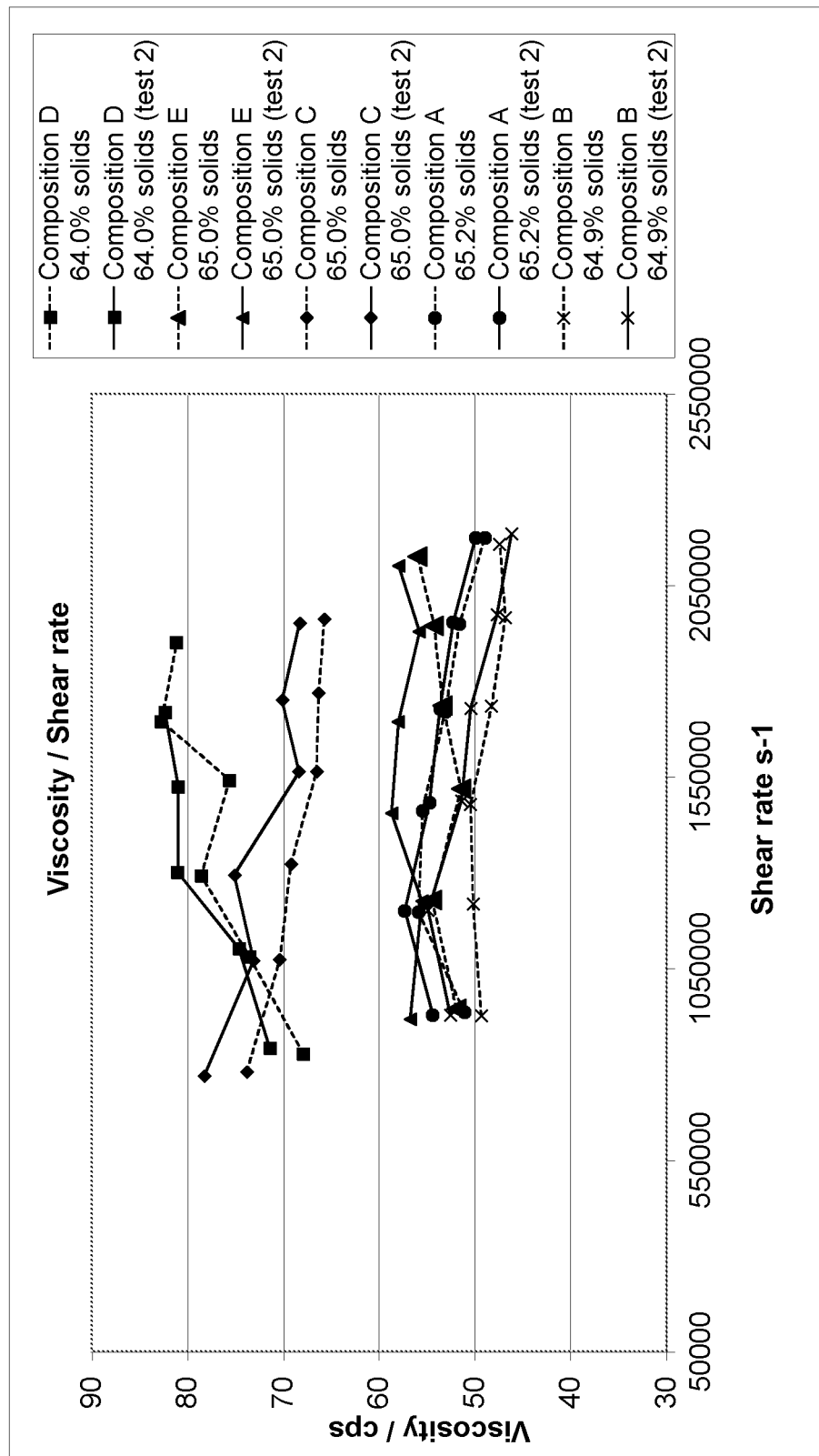
FIG. 1 shows the viscosity of compositions comprising calcium carbonate at various shear rates.

The calcium carbonates shown in Table 1 below were used in the following example.

TABLE 1

| Calcium Carbonate Sample | $d_{50}$ (μm) | % <2 μm | Steepness Factor |
| --- | --- | --- | --- |
| 1 | 0.32 | 99 | 33 |
| 2 | 1.5 | 60 | 28 |
| 3 | 0.7 | 90 | 36 |
| 4 | 0.41 | 97 | 64 |
| 5 | 1.1 | 75 | 28 |
| 6 | 0.45 | 99 | 35 |

Calcium carbonate compositions were prepared by combining individual calcium carbonate samples with each other.

The calcium carbonate in composition A consists of 80 wt % sample 2 and 20 wt % sample 1. The calcium carbonate in composition B consists of 20 wt % sample 1, 70 wt % sample 2 and 10 wt % sample 3. The calcium carbonate in composition C consists of 80 wt % sample 6 and 20 wt % sample 1.

Compositions D and E are comparative compositions comprising calcium carbonate which is 100 wt % sample 4 and 100 wt % sample 5 respectively.

TABLE 2

| Composition | $d_{50}$ (μm) | Steepness Factor |
| --- | --- | --- |
| A | 1.1 | 21 |
| B | 0.96 | 22 |
| C | 0.42 | 34 |
| D | 0.41 | 64 |
| E | 1.1 | 28 |

The viscosity of samples comprising compositions A to E at different shear rates was measured using an ACAV Automated Ultra High Shear Viscometer. The coating composition is forced through a narrow slit (specifically here 0.108 mm) by a piston. By increasing the pressure of the piston and analysing the subsequent flow rate through the slit (and using inputs of solid content, pH, density and B100 viscosity), the software is able to give viscosities over a range of shear rates. The results are shown in FIG. 1.

Despite being run at the lowest solids content, composition D shows the highest viscosity and shear thickening behaviour. Composition E is slightly shear thickening at 65% solids, whereas composition A, which has the same $d_{50}$ as composition E, is slightly shear thinning. Compositions B and C are also slightly shear thinning. This means that less thickener would be required in the coating colour, to increase the low shear viscosity and retain the water during the coating process.

Figure 2:
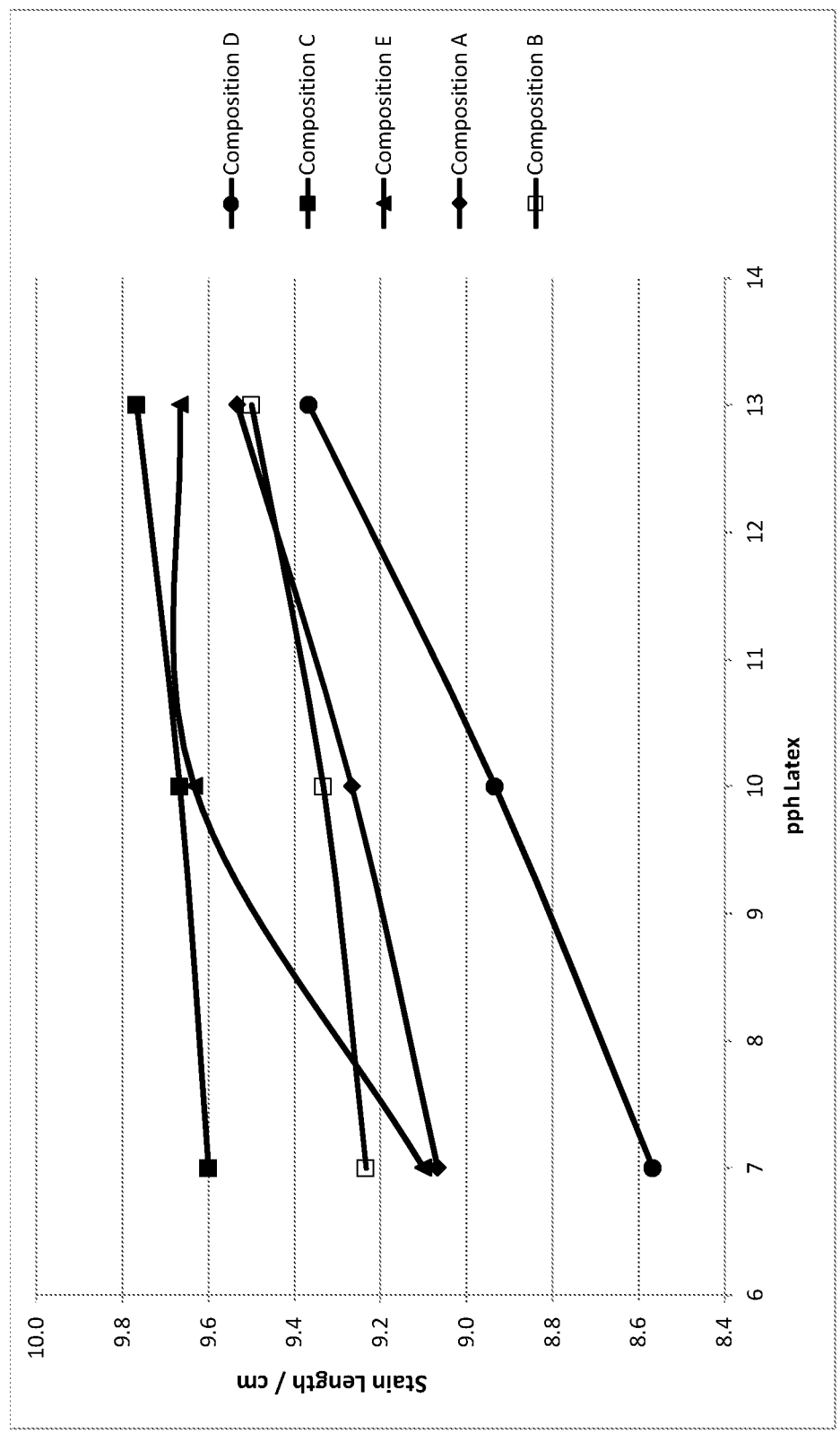
FIG. 2 shows the stain length of compositions comprising calcium carbonate with different levels of binder.

The stain length of samples comprising compositions A to E and different amounts of a latex binder was measured by as described above in the detailed description. The results are shown in FIG. 2.

Example 2

The calcium carbonates shown in Table 3 below were used in the following example.

TABLE 3

| Calcium Carbonate Sample | $d_{50}$ (μm) | % <2 μm | Steepness Factor |
| --- | --- | --- | --- |
| 1a | 1.5 | 60 | 28 |
| 2a | 1.1 | 75 | 28 |
| 3a | 0.32 | 99 | 33 |
| 4a | 0.5 | 95 | 35 |
| 5a | 1.9 | 50 | 31 |

Calcium carbonate compositions were prepared by combining individual calcium carbonate samples with each other.

The calcium carbonate in composition AA consists of 40 wt % sample 1a, 30 wt % sample 2a and 30 wt % sample 3a. The calcium carbonate in composition BB consists of 30 wt % sample 1a, 20 wt % sample 2a, 30 wt % sample 3a and 20 wt % sample 4a. The calcium carbonate in composition CC consists of 40 wt % sample 5a, 30 wt % sample 2a and 30 wt % sample 3a.

Composition DD is a comparative composition comprising calcium carbonate which is 100 wt % sample 2a.

The coating pore volume, pore size and CPVC point of compositions AA to DD were measured as described above in the detailed description. The results are shown in Table 3. The CPVC point was measured using a styrene butadiene rubber (SBR) latex binder.

TABLE 4

| Composition | $d_{50}$ (μm) | Steepness Factor | Coating Pore Volume (cm$^3$g$^{-1}$) | Mean Pore Size (μm) | CPVC (pph binder) |
| --- | --- | --- | --- | --- | --- |
| AA | 0.76 | 26 | 0.14 | 0.08 | 21 |
| BB | 0.64 | 29 | 0.14 | 0.09 | 23 |
| CC | 0.76 | 23 | 0.12 | 0.09 | 21 |
| DD | 1.1 | 28 | 0.15 | 0.12 | 29 |

Example 3

The calcium carbonates shown in Table 5 below were used in the following example.

TABLE 5

| Calcium Carbonate Sample | $d_{50}$ (μm) | % <2 μm | Steepness Factor |
| --- | --- | --- | --- |
| 1b | 1.1 | 75 | 28 |
| 2b | 0.32 | 99 | 33 |
| 3b | 1.9 | 50 | 31 |
| 4b | 0.72 | 90 | 32 |

Calcium carbonate compositions were prepared by combining individual calcium carbonate samples with each other.

The calcium carbonate in composition AAA consists of 40 wt % sample 3b, 30 wt % sample 1b and 30 wt % sample 2b.

Composition BBB is a comparative composition comprising calcium carbonate which is 100 wt % sample 4b.

Barrier coating compositions comprising 100 pph of composition AAA with 25 pph of a polyvinyl alcohol binder (5-88) or 100 pph of composition BBB with 35 pph of a polyvinyl alcohol binder (5-88) were prepared. A pre-coated woodfree base paper (100 gsm base) was coated with these barrier coating compositions at a coatweight of 10 gsm.

The OVTR (using decane), MVTR, Gurley air permeability, KIT test value and Emtec values of the coated base paper was measured as described above in the detailed description. Both the MVTR and the OVTR in this example were run at 21° C. and 50% humidity.

The results are shown in Table 6. It was found that the barrier composition comprising composition AAA provides an OVTR, KIT, Gurley air permeability that is equally as good as the barrier composition comprising composition BBB and an Emtec water penetration that is improved in comparison to the barrier composition comprising composition BBB.

TABLE 6

| Barrier Coating Composition | Gurley air permeability (s) | Kit test value | Time (s) at 50% transmission as measured by Emtec | OVTR (gsm/day) | MVTR (gsm/day) |
|---|---|---|---|---|---|
| AAA + 25 pph PVOH | >100,000 | 16 | 74 | 2.00 | 26.6 |
| BBB + 35 pph PVOH | >100,000 | 16 | 53 | 2.71 | 21.1 |

The following numbered paragraphs define particular embodiments of the present invention:

1. A composition comprising at least one inorganic particulate material, wherein the inorganic particulate material in the composition has a CPVC point less than about 29 pph binder.
2. The composition of paragraph 1, wherein the inorganic particulate material in the composition has a CPVC point equal to or less than about 28 pph binder, for example equal to or less than about 25 pph binder, for example equal to or less than about 23 pph binder.
3. The composition of paragraph 1 or 2, wherein the inorganic particulate material in the composition has a mean pore size equal to or less than about 1.1 μm, for example equal to or less than about 1.0 μm, or for example ranging from about 0.01 μm to about 1.1 μm.
4. The composition of any one of paragraphs 1 to 3, wherein the steepness factor of the inorganic particulate material in the composition is less than or equal to about 60, for example less than or equal to about 50, for example less than or equal to about 30, for example less than or equal to about 25.
5. The composition of any one of paragraphs 1 to 4, wherein the inorganic particulate material in the composition has a coating pore volume equal to or less than about 0.4 cm$^3$g$^{-1}$, for example equal to or less than about 0.15 cm$^3$g$^{-1}$, for example equal to or less than about 0.14 cm$^3$g$^{-1}$.
6. The composition of any one of paragraphs 1 to 5, wherein the inorganic particulate material in the composition has an shape factor equal to or less than about 20, for example equal to or less than about 10, for example equal to or less than about 5.
7. The composition of any one of paragraphs 1 to 6, wherein the at least one inorganic particulate material is calcium carbonate.
8. The composition of any one of paragraphs 1 to 7, wherein the inorganic particulate material in the composition has a d$_{50}$ ranging from about 0.1 μm to about 3.0 μm, for example from about 0.1 μm to about 2.0 μm, for example from about 0.2 μm to about 1.5 μm, for example from about 0.2 μm to about 1.0 μm, for example from about 0.2 μm to about 0.8 μm.
9. The composition of any one of paragraphs 1 to 8, wherein the composition has a coating stain length ranging from about 9 cm to about 12 cm, for example from about 9 cm to about 10 cm.
10. The composition of any one of paragraphs 1 to 9, wherein the binder that is used to measure the CPVC point of the inorganic particulate material is latex, for example styrene butadiene rubber (SBR) latex.
11. The composition of any one of paragraphs 1 to 10, wherein the composition comprises a first inorganic particulate material component having a first particle size distribution and a second inorganic particulate material component having a second particle size distribution.
12. The composition of paragraph 11, wherein the steepness factor of the total inorganic particulate material in the composition is equal to or lower than the steepness factor of the inorganic particulate material component having the lowest steepness factor.
13. The composition of paragraph 11 or 12, wherein the first inorganic particulate material component is calcium carbonate.
14. The composition of any one of paragraphs 11 to 13, wherein the second inorganic particulate material component is calcium carbonate.
15. The composition of any one of paragraphs 11 to 14, wherein the steepness factor of the first inorganic particulate material component is equal to or more than about 15, for example equal to or more than about 25, for example equal to or more than about 30.
16. The composition of any one of paragraphs 11 to 15, wherein the steepness factor of the first inorganic particulate material component is equal to or less than about 80, for example equal to or less than about 60, for example equal to or less than about 40.
17. The composition of any one of paragraphs 11 to 16, wherein the steepness factor of the second inorganic particulate material component is equal to or more than about 15, for example equal to or more than about 25, for example equal to or more than about 30.
18. The composition of any one of paragraphs 11 to 17, wherein the steepness factor of the second inorganic particulate material component is equal to or less than about 80, for example equal to or less than about 60, for example equal to or less than about 40.
19. The composition of any one of paragraphs 11 to 18, wherein the d$_{50}$ of the first inorganic particulate material component ranges from about 0.1 μm to about 3.0 μm, for example from about 0.1 μm to about 2.0 μm, for example from about 0.3 μm to about 1.5 μm.
20. The composition of any one of paragraphs 11 to 19, wherein the d$_{50}$ of the second inorganic particulate material component ranges from about 0.1 μm to about 3.0 μm, for example from about 0.1 μm to about 1.0 μm, for example from about 0.1 μm to about 0.5 μm.
21. The composition of any one of paragraphs 11 to 20, wherein the first and/or second inorganic particulate material component(s) has/have a shape factor equal to or less than about 20, for example equal to or less than about 10, for example equal to or less than about 5.
22. The composition of any one of paragraphs 11 to 21, wherein the composition further comprises a third inorganic particulate material component having a third particle size distribution.
23. The composition of paragraph 22, wherein the third inorganic particulate material component is calcium carbonate.
24. The composition of paragraph 22 or paragraph 23, wherein the steepness factor of the third inorganic particulate material component is equal to or more than about 15, for example equal to or more than about 25, for example equal to or more than about 30.
25. The composition of any one of paragraphs 22 to 24, wherein the steepness factor of the third inorganic particulate material component is equal to or less than about 80, for example equal to or less than about 60, for example equal to or less than about 40.

26. The composition of any one of paragraphs 22 to 25, wherein the $d_{50}$ of the third inorganic particulate material component ranges from about 0.1 µm to about 3.0 µm, for example from about 0.1 µm to about 2.0 µm, for example from about 0.3 µm to about 1.5 µm.
27. The composition of any one of paragraphs 22 to 26, wherein the third inorganic particulate material component has an shape factor equal to or less than about 20, for example equal to or less than about 10, for example equal to or less than about 5.
28. The composition of any one of paragraphs 11 to 27, wherein the first inorganic particulate material component is present in the composition in an amount ranging from about 50 wt % to about 90 wt %, for example from about 55 wt % to about 85 wt %, for example from about 60 wt % to about 80 wt %.
29. The composition of any one of paragraphs 11 to 28, wherein the second inorganic particulate material component is present in the composition in an amount ranging from about 10 wt % to about 50 wt %, for example from about 15 wt % to about 45 wt %, for example from about 20 wt % to about 40 wt %.
30. The composition of any one of paragraphs 22 to 29, wherein the third inorganic particulate material component is present in the composition in an amount ranging from about 5 wt % to about 30 wt %, for example from about 15 wt % to about 25 wt % or for example form about 5 wt % to about 15 wt %.
31. A method for making a composition of any one of paragraphs 1 to 30, the method comprising:
    combining a first inorganic particulate material component having a first particle size distribution with a second inorganic particulate material component having a second particle size distribution, and optionally combining a third inorganic particulate material component having a third particle size distribution with the first and/or second calcium carbonate components.
32. A composition comprising at least one inorganic particulate material obtainable by or obtained by the method of paragraph 31.
33. Use of a composition of any one of paragraphs 1 to 30, or a composition of paragraph 32 in a barrier coating composition.
34. A barrier coating composition comprising a binder and a composition of any one of paragraphs 1 to 30, or a composition of paragraph 32.
35. Use of a composition of any one of paragraphs 1 to 30, or a composition of paragraph 32, in a paper coating composition.
36. A paper coating composition comprising a binder and a composition of any one of paragraphs 1 to 30 or a composition of paragraph 32.
37. The barrier coating composition of paragraph 34 or the paper coating composition of paragraph 36, comprising equal to or less than about 50 pph of binder, for example equal to or less than about 40 pph of binder, for example equal to or less than about 35 pph binder.
38. The barrier coating composition of paragraph 34 or 37 or the paper coating composition of paragraph 36 or paragraph 37, wherein the binder is latex, for example styrene butadiene rubber (SBR) latex.
39. A product coated with a composition of any one of paragraphs 1 to 30, a composition of paragraph 32, a barrier coating composition of paragraph 34, 37 or 38, or a paper coating composition of any one of paragraphs 36 to 38.
40. The product of paragraph 39, wherein the product is paper, board, card, or paper board.
41. A method for making a paper coating composition comprising combining a composition of any one of paragraphs 1 to 30 or a composition of paragraph 32 with a binder.
42. A method for making a coated product, comprising:
    providing a product to be coated; and
    coating the product with a composition of any one of paragraphs 1 to 30, a composition of paragraph 32, a barrier coating composition of paragraph 34, 37 to 38, or a paper coating composition of any one of paragraphs 36 to 38.
43. The method of paragraph 42, wherein the product is paper, board, card, or paper board.

The invention claimed is:

1. A composition comprising an inorganic particulate material, wherein the inorganic particulate material comprises
    a first inorganic particulate material component having a $d_{50}$ of from 1.7 µm to 2.3 µm,
    a second inorganic particulate material component having a $d_{50}$ of from 0.8 µm to 1.2 µm, and
    a third inorganic particulate material component having a $d_{50}$ from 0.1 µm to 0.5 µm,
wherein the inorganic particulate material in the composition has a CPVC point less than 29 pph binder and a steepness factor less than or equal to 25;
the first, second, and third inorganic particulate material components are calcium carbonate;
the binder used to measure the CPVC point is a styrene butadiene rubber latex; and
the inorganic particulate material in the composition has a shape factor ranging from 2 to 20;
wherein the inorganic particulate material is not aragonite.

2. The composition of claim 1, wherein the inorganic particulate material in the composition has a mean pore size equal to or less than 1.1 µm.

3. The composition of claim 1, wherein
    the first inorganic particulate material component has a steepness factor ranging from about 25 to about 35,
    the second inorganic particulate material component has a steepness factor ranging from about 25 to about 35, and
    the third inorganic particulate material component has a steepness factor ranging from about 30 to about 40; and
    the steepness factor of the inorganic particulate material in the composition is equal to or lower than the steepness factors of the first, second, and third inorganic particulate materials.

4. The composition of claim 1, wherein the steepness factor of the first or second inorganic particulate material component is:
    (a) equal to or more than 15; and
    (b) equal to or less than 80.

5. The composition of claim 1, wherein the first, second, or third inorganic particulate material component has a shape factor equal to or less than 20.

6. The composition of claim 1,
    wherein the first inorganic particulate material component is present in the composition in an amount ranging from about 50 wt % to about 90 wt % based upon the total weight of the composition and
    wherein the second inorganic particulate material component is present in the composition in an amount ranging from about 10 wt % to about 50 wt % based upon the total weight of the composition.

7. The composition of claim 1, wherein the inorganic particulate material in the composition has a coating pore volume equal to or less than 0.4 $cm^3g^{-1}$.

8. The composition of claim 1, wherein the inorganic particulate material in the composition has a $d_{50}$ in a range of about 0.1 μm to about 3.0 μm.

9. The composition of claim 1, wherein the inorganic particulate material has a steepness factor that ranges from about 20 to about 25.

10. A method for making the composition of claim 1, the method comprising:
   combining the first inorganic particulate material component with the second inorganic particulate material component and the third inorganic particulate material component.

11. A barrier coating composition or a paper coating composition comprising a binder and the composition of claim 1.

12. A product coated with a composition of claim 1 or a barrier coating composition or paper coating composition of claim 11.

* * * * *